(12) United States Patent
Hwang et al.

(10) Patent No.: US 11,997,545 B2
(45) Date of Patent: May 28, 2024

(54) METHOD AND DEVICE FOR CONDITIONALLY ADDING AND CHANGING CELL

(71) Applicant: Samsung Electronics Co., Ltd., Gyeonggi-do (KR)

(72) Inventors: June Hwang, Gyeonggi-do (KR); Himke Van Der Velde, Gyeonggi-do (KR); Beomsik Bae, Gyeonggi-do (KR); Soenghun Kim, Gyeonggi-do (KR)

(73) Assignee: Samsung Electronics Co. Ltd (KR)

( * ) Notice: Subject to any disclaimer, the term of this patent is extended or adjusted under 35 U.S.C. 154(b) by 290 days.

(21) Appl. No.: 17/765,285

(22) PCT Filed: Sep. 29, 2020

(86) PCT No.: PCT/KR2020/013409
§ 371 (c)(1),
(2) Date: Mar. 30, 2022

(87) PCT Pub. No.: WO2021/066567
PCT Pub. Date: Apr. 8, 2021

(65) Prior Publication Data
US 2022/0369172 A1    Nov. 17, 2022

(30) Foreign Application Priority Data

Oct. 2, 2019   (KR) .................... 10-2019-0122156
Oct. 2, 2019   (KR) .................... 10-2019-0122683
Nov. 7, 2019   (KR) .................... 10-2019-0142068

(51) Int. Cl.
*H04W 36/00*   (2009.01)
*H04W 8/22*    (2009.01)
(Continued)

(52) U.S. Cl.
CPC ......... *H04W 36/0016* (2013.01); *H04W 8/22* (2013.01); *H04W 36/0079* (2018.08)

(58) Field of Classification Search
CPC ......... H04W 36/0016; H04W 36/0079; H04W 36/00698; H04W 8/22; H04W 36/00;
(Continued)

(56) References Cited

U.S. PATENT DOCUMENTS 10,687,263 B2   6/2020   Paladugu et al.
11,026,291 B2   6/2021   Sharma et al.
(Continued)

FOREIGN PATENT DOCUMENTS

WO   WO 2019/066628   4/2019
WO   WO 2019/161099   8/2019

OTHER PUBLICATIONS

PCT/ISA/210 Search Report issued on PCT/KR2020/013409, dated Jan. 12, 2021 pp. 5.
(Continued)

*Primary Examiner* — Ahmed Elallam
(74) *Attorney, Agent, or Firm* — The Farrell Law Firm, P.C.

(57) ABSTRACT

The present disclosure relates to a communication technique for merging IoT technology with a 5G communication system for supporting higher data transmission rates than 4G systems, and a system therefor. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. In addition, the present disclosure relates to a method for adding or changing a cell, and a device for performing same.

20 Claims, 22 Drawing Sheets

(58) Field of Classification Search
CPC . H04W 28/18; H04W 36/0005; H04W 36/24; H04W 76/18
See application file for complete search history.

(56) References Cited

U.S. PATENT DOCUMENTS

| | | | | |
|---|---|---|---|---|
| 11,310,685 | B2* | 4/2022 | Bae | H04W 24/10 |
| 11,503,510 | B2* | 11/2022 | Hwang | H04W 36/0055 |
| 11,582,651 | B2* | 2/2023 | Chen | H04L 5/001 |
| 11,743,785 | B2* | 8/2023 | Chen | H04W 36/0072 370/331 |
| 2022/0038968 | A1* | 2/2022 | Latheef | H04W 36/305 |
| 2022/0110180 | A1* | 4/2022 | Jung | H04W 24/10 |
| 2022/0191753 | A1* | 6/2022 | Hwang | H04W 36/36 |
| 2022/0217594 | A1* | 7/2022 | Kim | H04W 36/38 |
| 2022/0386207 | A1* | 12/2022 | Rugeland | H04W 76/19 |
| 2022/0394583 | A1* | 12/2022 | Deenoo | H04W 24/08 |

OTHER PUBLICATIONS

PCT/ISA/237 Written Opinion issued on PCT/KR2020/013409, dated Jan. 12, 2021, pp. 4.
Huawei, HiSilicon, 3GPP TSG-RAN WG2 Meeting#107 R2-1910520 Prague, Czech Republic, Aug. 16, 2019, "Discussion on Conditional SN Change in MR-DC scenario", pp. 6.
ZTE Corporation, Sanechips, 3GPP TSG RAN WG2 Meeting #107 R2-1910744 Prague, Czech Republic, Aug. 16, 2019, "Discussion on applying CHO based SCG mobility", pp. 6.
NTT DOCOMO, Inc., Nokia, Ericsson, Fujitsu, KT Corp, Media Tek Inc., NEC, Qualcomm Inc., SoftBank Corp., 3GPP TSG-RAN WG2 Meeting #107 R2-1911344 Prague, Czech, Aug. 16, 2019, "Support of Conditional PSCell addition/change", pp. 5.
Nokia, Nokia Shanghai Bell (Rapporteur), 3GPP TSG-RAN WG2 #107 R2-1911752 Prague, Czech Republic, Aug. 30, 2019, "Report of Offline discussion #004", pp. 5.

* cited by examiner (a)

If SCG HO or CHO failure,
UE report the above failure report to MN, with new element:

New in report
- failure type (1 bit indicator for CHO failure) in LTE and NR container
  available CHO candidate info (available candidate ID) in LTE/ NR container
- failed cell info (PCI, CGI, candidate id, node id) in NR container and/or LTE part:
  unlike the normal HO failure, CHO could have multiple execution targets cells and target SNs,
  and only UE can know which target cell/or SN is selected
  (since the selection is UE implementation).
  Also there is arbitrary time between CHO configuration and execution,
  so no time correlation to judge which cell was tried.
- Used measurement result As a CHO configuration which could be two events

FIG. 18B

If SCG HO or CHO failure,
UE report the above failure report to MN, with new element:

New in report
- failure type (1 bit indicator for CHO failure) in LTE and NR container
- available CHO candidate info (available candidate ID) in LTE/ NR container
- failed cell info (PCI, CGI, candidate id, node id) in NR container and/or LTE part;
  unlike the normal HO failure, CHO could have multiple execution targets cells and target SNs,
  and only UE can know which target cell/or SN is selected
  (since the selection is UE implementation).
  Also there is arbitrary time between CHO configuration and execution,
  so no time correlation to judge which cell was tried.
- used measurement result As a CHO configuration which could be two events

METHOD AND DEVICE FOR CONDITIONALLY ADDING AND CHANGING CELL

PRIORITY

This application is a National Phase Entry of PCT International Application No. PCT/KR2020/013409, which was filed on Sep. 29, 2020, and claims priority to Korean Patent Applications Nos. 10-2019-0122156, 10-2019-0122683 and 10-2019-0142068, which were filed on Oct. 2, 2019, Oct. 2, 2019, and Nov. 7, 2019, respectively, the entire content of each of which is incorporated herein by reference.

TECHNICAL FIELD

The disclosure relates to a method and a device for adding and changing a cell. In addition, the disclosure relates to a method and a device for conditionally adding and changing a cell and, more particularly, to addition and change of a primary secondary cell (PSCell) or secondary cell (SCell). In addition, the disclosure relates to a method and a device for a handover in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, various services can be provided, and accordingly there is a need for schemes to effectively provide these services. In particular, various method for efficient handover are being provided.

DISCLOSURE OF INVENTION

Technical Problem

A technical problem to be solved by an embodiment of the disclosure relates to a method and a device for improved cell addition and change.

In addition, a technical problem to be solved by an embodiment of the disclosure relates to a method and a device for conditional cell addition and change, and to a method and a device for addition and change of a PSCell or SCell.

In addition, a technical problem to be solved by an embodiment of the disclosure relates to a method and a device for a secondary node (SN) handover which is robust against channel weakening, in order to improve the occurrence of a case in which a timely handover cannot be performed due to control signal instability when a terminal in a dual connection or dual connectivity state changes a PSCell.

In addition, a technical problem to be solved by an embodiment of the disclosure is to provide an effective handover method in a mobile communication system.

Solution to Problem

An embodiment of the disclosure may provide a method performed by a master node (MN) in a wireless communication system, the method including: receiving, from a source-secondary node (S-SN), a first message including a conditional handover indicator, a conditional handover candidate cell list, a condition for each candidate cell, source cell group configuration information generated by the S-SN, and target cell group configuration information generated by the S-SN; transmitting, based on the first message and to a first target-secondary node (T-SN), a second message including the target cell group information; receiving, from the first T-SN, a third message including the target cell group information updated by the first T-SN; and transmitting, to a terminal, an MN radio resource control (RRC) reconfiguration message including an S-SN RRC reconfiguration message, wherein the S-SN RRC message further includes the source cell group configuration information generated by the S-SN and the target cell group information updated by the first T-SN.

In addition, an embodiment of the disclosure may provide a master node (MN) in a wireless communication system, the MN including: a transceiver; and a controller configured to perform control to receive, from a source-secondary node (S-SN), a first message including a conditional handover indicator, a conditional handover candidate cell list, a condition for each candidate cell, source cell group configuration information generated by the S-SN, and target cell group configuration information generated by the S-SN, transmit, based on the first message and to a first target-secondary node (T-SN), a second message including the target cell group information, receive, from the first T-SN, a third message including the target cell group information updated by the first T-SN, and transmit, to a terminal, an MN radio resource control (RRC) reconfiguration message including an S-SN RRC reconfiguration message, wherein the S-SN RRC message further includes the source cell group configuration information generated by the S-SN and the target cell group information updated by the first T-SN.

In addition, an embodiment of the disclosure may provide a method performed by a target-secondary node (T-SN) in a wireless communication system, the method including: receiving, from a master node (MN), a first message including a conditional handover indicator, source cell group configuration information generated by a source-secondary node (S-SN), a target candidate identifier list, a target cell identifier related to the target candidate identifier list, cell group configuration information requested by the MN from the T-SN, and target cell group information; determining, based on the first message, to update the target cell group information; and transmitting, to the MN, a second message including the updated target cell group information.

In addition, an embodiment of the disclosure may provide a target-secondary node (T-SN) in a wireless communication system, the T-SN including: a transceiver; and a controller configured to perform control to receive, from a master node (MN), a first message including a conditional handover indicator, source cell group configuration information generated by a source-secondary node (S-SN), a target candidate identifier list, a target cell identifier related to the target candidate identifier list, cell group configuration information requested by the MN from the T-SN, and target cell group information, determine, based on the first message, to update the target cell group information, and transmit, to the MN, a second message including the updated target cell group information.

The technical subjects pursued in embodiments of the disclosure may not be limited to the above mentioned technical subjects, and other technical subjects which are not mentioned may be clearly understood, through the following descriptions, by those skilled in the art to which the disclosure pertains.

Advantageous Effects of Invention

An embodiment of the disclosure may provide a method and a device for improved cell addition and change.

In addition, an embodiment of the disclosure may provide a method and a device for addition and change of a PSCell or SCell, based on a method and a device for conditional cell addition and change.

In addition, an embodiment of the disclosure may provide a method and a device for a handover which is robust against channel weakening in a case in which a terminal in a dual connection state changes a PSCell.

In addition, an embodiment of the disclosure may provide a device and a method capable of effectively providing a service in a mobile communication system.

BRIEF DESCRIPTION OF DRAWINGS

FIG. 16A and FIG. 16B are a flowchart of a case of transmitting a new failure report when a conditional PSCell change using an SRB3 fails according to an embodiment of the disclosure:

FIG. 18A and FIG. 18B, a flowchart of a case of, when performing a conditional PSCell change by using an SRB3, and notifying an MN of the performing via an MN RRC message, processing PSCell change failure according to an embodiment of the disclosure;

MODE FOR THE INVENTION

Figure 1:
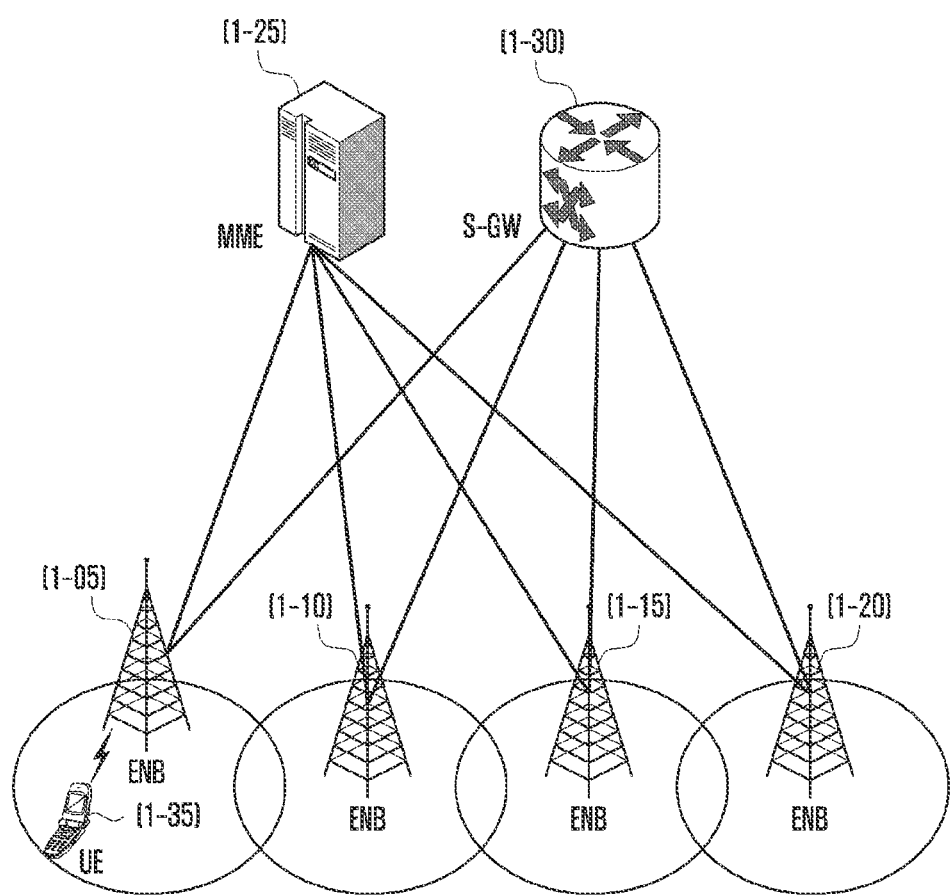
FIG. 1 is a diagram illustrating a structure of an LTE system according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions.

These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd Generation Partnership Project Long Term Evolution (3GPP LTE) standards for the convenience of description. However, the disclosure is not limited by these terms and names, and may be applied in the same way to systems that conform other standards.

In various embodiments of the disclosure, an MN may be interpreted as a master base station, and an SN may be interpreted as a secondary base station. In addition, in various embodiments of the disclosure, an MN and an SN may be interpreted as different base stations or base stations using different radio access technologies (RATs), and in some cases, may be used as base stations using the same RAT. An MN and an SN may be distinguished by using normal expressions such as a first base station and a second base station.

In various embodiments of the disclosure, an RRC message transmitted by an MN may be named an MN RRC message, an MN RRC reconfiguration message, an MN reconfiguration message, an LTE RRC message, etc. In various embodiments of the disclosure, an RRC message generated by an SN may be named an SN RRC message, an SN RRC reconfiguration message, an SN reconfiguration message, an NR RRC message, etc.

<First Disclosure>

FIG. 1 is a diagram illustrating a structure of an LTE system according to an embodiment of the disclosure.

Referring to FIG. 1, as illustrated therein, a wireless access network of the LTE system may include next generation base stations (evolved node Bs, hereinafter, ENBs, node Bs, or base stations) 1-05, 1-10, 1-15, and 1-20, a mobility management entity (MME) 1-25, and a serving gateway (S-GW) 1-30. A user terminal (user equipment, hereinafter, a UE or a terminal) 1-35 may access an external network via the ENBs 1-05 to 1-20 and the S-GW 1-30.

In FIG. 1, the ENBs 1-05 to 1-20 may correspond to a conventional node B of a UMTS system. The ENB may be connected to the UE 1-35 through a wireless channel and may perform more complex roles compared to a conventional node B. In the LTE system, all the user traffic including real-time services such as a voice over IP (VoIP), which is performed through the Internet protocol, may be serviced through a shared channel. Therefore, the LTE system may require a device that collects pieces of information including a buffer state, an available transmission power state, and a channel state of UEs, and performs scheduling, and the ENBs 1-05 to 1-20 may serve as the device. A single ENB may generally control a plurality of cells. For example, the LTE system may use, as a wireless access technology, for example, orthogonal frequency division multiplexing (OFDM) in a bandwidth of 20 MHz in order to implement a transfer rate of 100 Mbps. Furthermore, the LTE system may apply an adaptive modulation & coding (AMC) scheme for determining a modulation scheme and a channel coding rate according to a channel state of a terminal. The S-GW 1-30 is a device that provides a data bearer, and may generate or remove a data bearer according to a control of the MME 1-25. The MME 1-25 is a device configured to perform various control functions as well as a mobility management function for the terminal 1-35, and may be connected to the multiple base stations 1-05 to 1-20.

Figure 2:
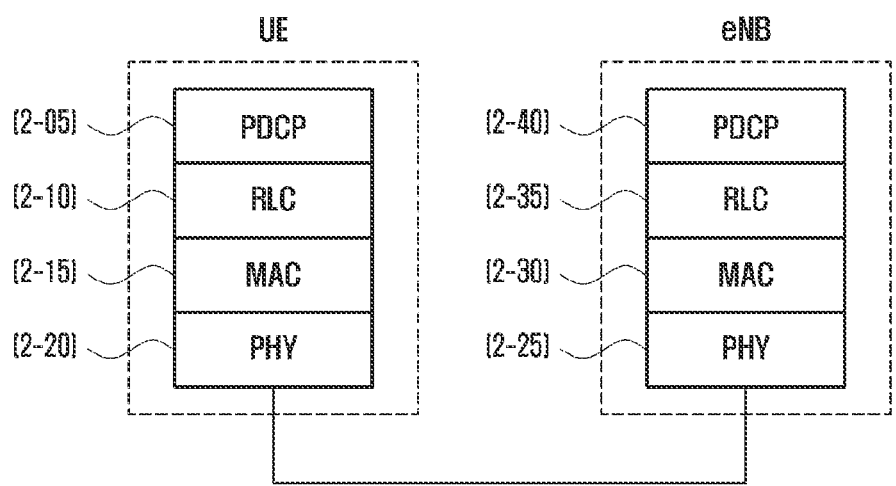
FIG. 2 is a diagram illustrating a wireless protocol structure of an LTE system according to an embodiment of the disclosure.

FIG. 2 is a diagram illustrating a wireless protocol structure of an LTE system according to an embodiment of the disclosure.

Referring to FIG. 2, a wireless protocol of the LTE system may include packet data convergence protocols (PDCPs) 2-05 and 2-40, radio link controls (RLCs) 2-10 and 2-35, and medium access controls (MACs) 2-15 and 2-30 in a terminal and an ENB, respectively. The PDCPs 2-05 and 2-40 may function to perform an operation such as IP header compression/reconstruction. Main functions of the PDCPs 2-05 and 2-40 may be summarized as follows.

Header compression and decompression (ROHC only)
 Transfer of user data
 In-sequence delivery (in-sequence delivery of upper layer PDUs at PDCP re-establishment procedure for RLC AM)
 Reordering (For split bearers in DC (only support for RLC AM); PDCP PDU routing for transmission and PDCP PDU reordering for reception)
 Duplicate detection (Duplicate detection of lower layer SDUs at PDCP re-establishment procedure for RLC AM)
 Retransmission (Retransmission of PDCP SDUs at handover and, for split bearers in DC, of PDCP PDUs at PDCP data-recovery procedure, for RLC AM)
 Ciphering and deciphering
 Timer-based SDU discard (Timer-based SDU discard in uplink)

The radio link controls (RLCs) 2-10 and 2-35 may reconfigure a PDCP packet data unit (PDU) to have a proper size, so as to perform an automatic repeat request (ARQ) operation, etc. Main functions of the RLCs 2-10 and 2-35 may be summarized as follows.

Data transfer (Transfer of upper layer PDUs)
 ARQ (Error Correction through ARQ (only for AM data transfer))
 Concatenation, segmentation and reassembly (Concatenation, segmentation and reassembly of RLC SDUs (only for UM and AM data transfer))
 Re-segmentation (Re-segmentation of RLC data PDUs (only for AM data transfer))
 Reordering (Reordering of RLC data PDUs (only for UM and AM data transfer))
 Duplicate detection (Duplicate detection (only for UM and AM data transfer))
 Error detection (Protocol error detection (only for AM data transfer))
 RLC SDU discard (only for UM and AM data transfer)
 RLC re-establishment The MACs 2-15 or 2-30 is connected to several RLC layer devices configured in a single terminal, may multiplex RLC PDUs to a MAC PDU, and demultiplex a MAC PDU to RLC PDUs. Main functions of the MACs 2-15 and 2-30 may be summarized as follows.

Mapping (Mapping between logical channels and transport channels)
 Multiplexing and demultiplexing (Multiplexing/demultiplexing of MAC SDUs belonging to one or different logical channels into/from transport blocks (TB) delivered to/from the physical layer on transport channels)
 Scheduling information reporting
 Hybrid automatic repeat request (HARQ) (Error correction through HARQ)
 Priority handling between logical channels (Priority handling between logical channels of one UE)
 Priority handling between UEs (Priority handling between UEs by means of dynamic scheduling)
 MBMS service identification
 Transport format selection
 Padding Physical layers 2-20 and 2-25 may perform channel coding and modulation on upper layer data to make the data into an OFDM symbol and transmit the OFDM symbol through a wireless channel, or may perform demodulation and channel-decoding on an OFDM symbol received through a wireless channel, and then transfer the OFDM symbol to an upper layer.

Figure 3:
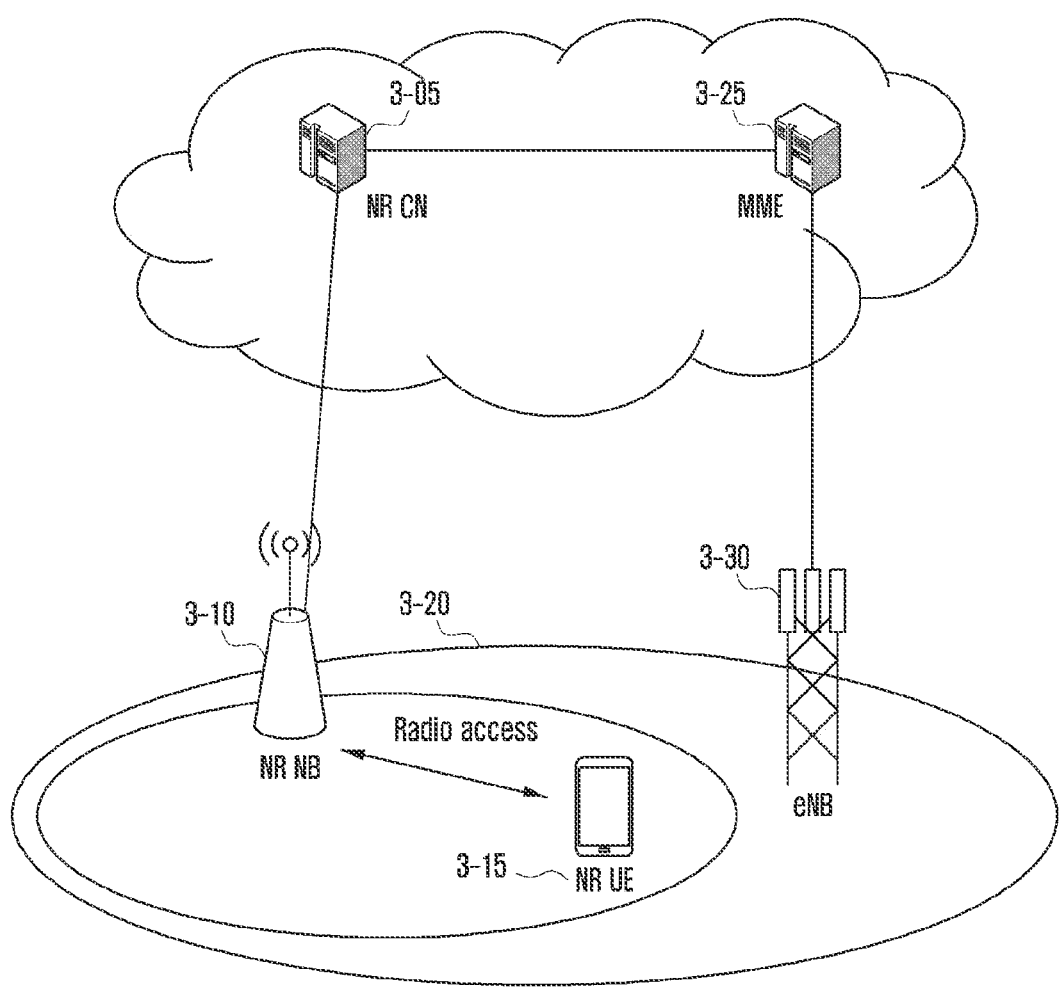
FIG. 3 is a diagram illustrating a structure of a next generation mobile communication system according to an embodiment of the disclosure.

FIG. 3 is a diagram illustrating a structure of a next generation mobile communication system according to an embodiment of the disclosure.

Referring to FIG. 3, a wireless access network of the next generation mobile communication system (hereinafter, NR or 2g) may include a next generation base station (a new radio node B, hereinafter, an NR gNB or an NR base station) 3-10 and a next generation wireless core network (a new radio core network, NR CN) 3-05. A next generation wireless user terminal (a new radio user equipment, an NR UE or a terminal) 3-15 may access an external network via the NR gNB 3-10 and the NR CN 3-05.

In FIG. 3, the NR gNB 3-10 may correspond to an evolved node B (eNB) of a conventional LTE system. The NR gNB 3-10 is connected to the NR UE 3-15 through a wireless channel and may provide an outstanding service compared to a conventional node B. In the NR system, all the user traffic may be serviced through a shared channel. Therefore, the NR system may require a device that collects state information, such as a buffer state, an available transmission power state, and a channel state of UEs, and performs scheduling, and the NR NB 3-10 may serve as the device. A single NR gNB may control a plurality of cells. In order to implement ultra-high speed data transfer compared to the current LTE, the NR system may employ a bandwidth larger than or equal to the current maximum bandwidth. In addition, a beamforming technology may be additionally integrated with orthogonal frequency division multiplexing (OFDM) as a wireless access technology. Furthermore, an adaptive modulation and coding (hereinafter, referred to as an AMC) scheme for determining a modulation scheme and a channel coding rate according to a channel state of a terminal may be applied. The NR CN 3-05 may perform functions such as mobility support, bearer configuration, and quality of service (QoS) configuration. The NR CN 3-05 is a device that performs various control functions as well as a mobility management function for a terminal, and may be connected to a plurality of base stations. In addition, the NR system may be linked to a conventional LTE system, and the NR CN 3-05 may be connected to an MME 3-25 via a network interface. The MME 3-25 may be connected to an eNB 3-30 that is a conventional base station.

Figure 4:
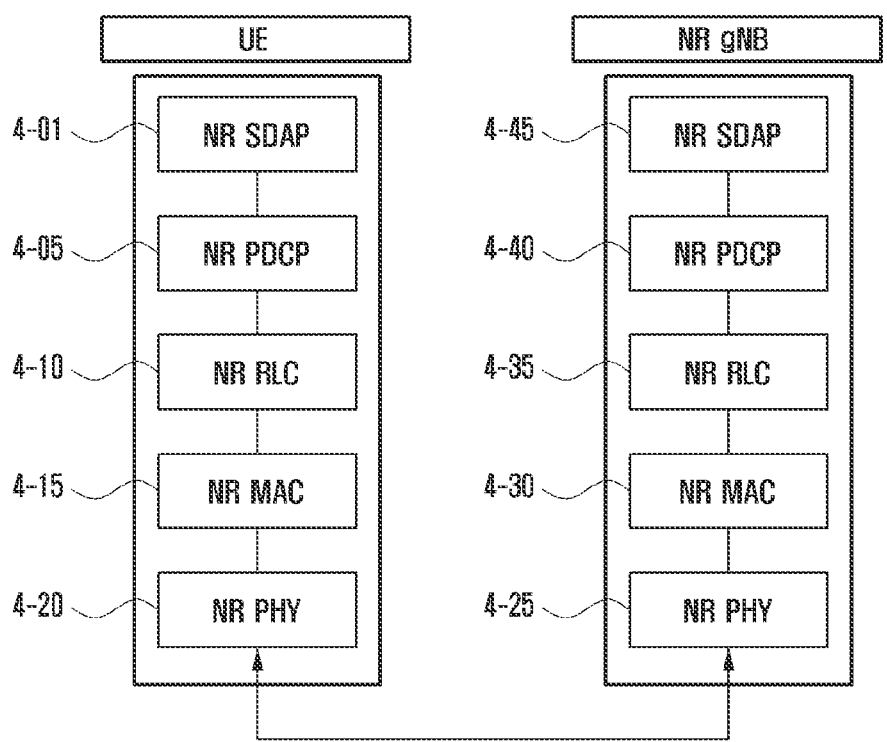
FIG. 4 is a diagram illustrating a wireless protocol structure of a next generation mobile communication system according to an embodiment of the disclosure.

FIG. 4 is a diagram illustrating a wireless protocol structure of a next generation mobile communication system according to an embodiment of the disclosure.

Referring to FIG. 4, a wireless protocol of the next generation mobile communication system may include NR service data adaptation protocols (SDAPs) 4-01 and 4-45, NR PDCPs 4-05 and 4-40, NR RLCs 4-10 and 4-35, and NR MACs 4-15 and 4-30 in a terminal and an NR base station, respectively.

Main functions of the NR SDAPs 4-01 and 4-45 may include some of the following functions.

- Transfer of user data (transfer of user plane data)
- Mapping between a QoS flow and a data bearer for uplink and downlink (mapping between a QoS flow and a data radio bearer (DRB) for both DL and UL)
- Marking QoS flow ID in DL and UL (marking QoS flow ID in both DL and UL packets)
- Mapping a reflective QoS flow to a data bearer with respect to UL SDAP PDUs (reflective QoS flow to DRB mapping for the UL SDAP PDUs)

In relation to an SDAP layer device, the terminal may receive a configuration relating to whether to use a function of the SDAP layer device or whether to use a header of the SDAP layer device for each PDCP layer device, each bearer, or each logical channel, through a radio resource control (RRC) message. When a SDAP header is configured, the terminal may indicate the terminal to update or reconfigure mapping information relating to a QoS flow and a data bearer for uplink and downlink by using a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header. The SDAP header may include QoS flow ID information indicating a QoS. The QoS information may be used as data processing priority, scheduling information, etc. for smoothly supporting services.

Main functions of the NR PDCPs 4-05 and 4-40 may include some of the following functions.

- Header compression and decompression (ROHC only)
- Transfer of user data
- In-sequence delivery (In-sequence delivery of upper layer PDUs)
- Out-of-sequence delivery (Out-of-sequence delivery of upper layer PDUs)
- Reordering (PDCP PDU reordering for reception)
- Duplicate detection (Duplicate detection of lower layer SDUs)
- Retransmission (Retransmission of PDCP SDUs)
- Ciphering and deciphering
- Timer-based SDU discard (Timer-based SDU discard in uplink)

In the above description, the reordering of the NR PDCP devices may mean reordering of PDCP PDUs received from a lower layer, according to an order based on a PDCP sequence number (SN). The reordering of the NR PDCP devices may include a function of transferring data to an upper layer according to a rearranged order, may include a function of directly transferring data without considering an order, may include a function of rearranging an order to record lost PDCP PDUs, may include a function of reporting the state of lost PDCP PDUs to a transmission side, or may include a function of requesting retransmission of lost PDCP PDUs.

Main functions of the NR RLCs 4-10 and 4-35 may include some of the following functions.

- Data transfer (Transfer of upper layer PDUs)
- In-sequence delivery (In-sequence delivery of upper layer PDUs)
- Out-of-sequence delivery (Out-of-sequence delivery of upper layer PDUs)
- ARQ (Error correction through ARQ)
- Concatenation, segmentation and reassembly (Concatenation, segmentation and reassembly of RLC SDUs)
- Re-segmentation (Re-segmentation of RLC data PDUs)
- Reordering (Reordering of RLC data PDUs)
- Duplicate detection
- Error detection (Protocol error detection)
- RLC SDU discard
- RLC re-establishment In the above description, the in-sequence delivery function of the NR RLC devices may mean a function of transferring RLC SDUs received from a lower layer, to an upper layer according to an order. The in-sequence delivery of the NR RLC devices may include a function of, if a single RLC SDU is divided into several RLC SDUs and then the RLC SDUs are received, reassembling the several RLC SDUs and transmitting the reassembled RLC SDUs.

The in-sequence delivery of the NR RLC devices may include a function of rearranging received RLC PDUs with reference to a RLC sequence number (SN) or a PDCP sequence number (SN), may include a function of rearranging an order to record lost RLC PDUs, may include a function of reporting the state of lost RLC PDUs to a transmission side, and may include a function of requesting retransmission of lost RLC PDUs.

The in-sequence delivery of the NR RLC devices may include a function of, if there is a lost RLC SDU, only transferring RLC SDUs before the lost RLC SDU to an upper layer according to an order.

The in-sequence delivery of the NR RLC devices may include a function of, although there is a lost RLC SDU, if a predetermined timer expires, transferring, all the RLC SDUs received before the timer has started, to an upper layer according to an order.

The in-sequence delivery of the NR RLC devices may include a function of, although there is a lost RLC SDU, if a predetermined timer expires, transferring, all the RLC SDUs received until the current time point, to an upper layer according to an order.

The NR RLC devices may process RLC PDUs according to an order in which the RLC PDUs have been received, regardless of an order based on a sequence number (out-of-sequence delivery), and transfer the processed RLC PDUs to the NR PDCP devices.

In a case of segment reception of the NR RLC devices, the NR RLC devices may receive segments that have been stored in a buffer or are to be received later, reconfigure the segments into a single intact RLC PDU, and transfer the RLC PDU to the NR PDCP devices.

An NR RLC layer may not include a concatenation function, and the concatenation function may be performed in an NR MAC layer or replaced with a multiplexing function of an NR MAC layer.

In the above description, the out-of-sequence delivery of the NR RLC devices may mean a function of directly transferring RLC SDUs received from a lower layer, to an upper layer regardless of an order. The out-of-sequence delivery of the NR RLC devices may include a function of, if a single RLC SDU is divided into several RLC SDUs and then the RLC SDUs are received, reassembling the several RLC SDUs and transmitting the reassembled RLC SDUs. The out-of-sequence delivery of the NR RLC devices may include a function of storing RLC SNs or PDCP SNs of received RLC PDUs and sequencing the RLC PDUs to record lost RLC PDUs.

The NR MACs 4-15 and 4-30 may be connected to several NR RLC layer devices configured in a single device, and main functions of the NR MAC 4-15 and 4-30 may include some of the functions below.

Mapping (Mapping between logical channels and transport channels)
Multiplexing and demultiplexing (Multiplexing/demultiplexing of MAC SDUs)
Scheduling information reporting
HARQ (Error correction through HARQ)
Priority handling between logical channels (Priority handling between logical channels of one UE)
Priority handling between UEs (Priority handling between UEs by means of dynamic scheduling)
MBMS service identification
Transport format selection
Padding NR PHY layers 4-20 and 4-25 may perform channel coding and modulation on upper layer data to make the data into an OFDM symbol and transmit the OFDM symbol through a wireless channel, or may perform demodulation and channel-decoding on an OFDM symbol received through a wireless channel, and then transfer the OFDM symbol to an upper layer.

Figure 5:
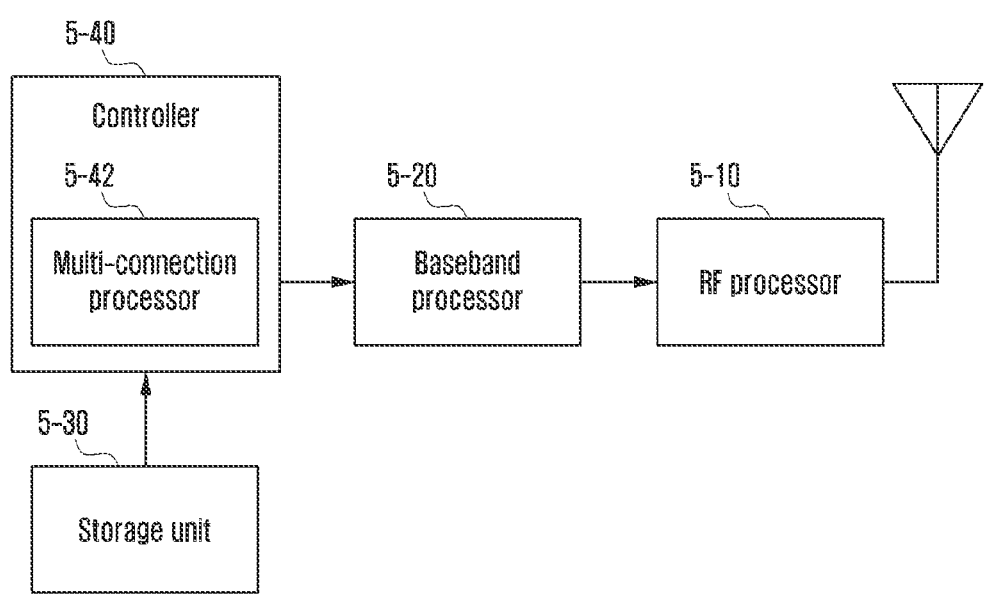
FIG. 5 is a block diagram illustrating an internal structure of a terminal according to an embodiment of the disclosure.

FIG. 5 is a block diagram illustrating an internal structure of a terminal according to an embodiment of the disclosure.

Referring to the diagram, the terminal may include a radio frequency (RF) processor 5-10, a baseband processor 5-20, a storage unit 5-30, and a controller 5-40. In addition, the controller 5-40 may further include a multi-connection processor 5-42.

The RF processor 5-10 performs a function, such as signal band change, amplification, etc., for transmitting or receiving a signal through a wireless channel. That is, the RF processor 5-10 upconverts a baseband signal provided from the baseband processor 5-20, into an RF band signal, and then transmits the RF band signal through an antenna, and downconverts an RF band signal received through the antenna, into a baseband signal. For example, the RF processor 5-10 may include a transmission filter, a reception filter, an amplifier, a mixer, an oscillator, a digital-to-analog converter (DAC), an analog-to-digital converter (ADC), and the like. In the diagram, only one antenna is illustrated, but the terminal may include a plurality of antennas. In addition, the RF processor 5-10 may include a plurality of RF chains. Furthermore, the RF processor 5-10 may perform beamforming. To perform the beamforming, the RF processor 5-10 may adjust the phase and size of each of signals transmitted or received through a plurality of antennas or antenna elements. In addition, the RF processor may perform MIMO, and may receive several layers when a MIMO operation is performed.

The baseband processor 5-20 performs a function of conversion between a baseband signal and a bitstream according to a physical layer protocol of a system. For example, when data is transmitted, the baseband processor 5-20 generates complex symbols by encoding and modulating a transmission bitstream. In addition, when data is received, the baseband processor 5-20 reconstructs a reception bitstream by demodulating and decoding a baseband signal provided from the RF processor 5-10. For example, in a case where an orthogonal frequency division multiplexing (OFDM) scheme is applied, when data is transmitted, the baseband processor 5-20 generates complex symbols by encoding and modulating a transmission bitstream, maps the complex symbols to subcarriers, and then configures OFDM symbols through inverse fast Fourier transform (IFFT) calculation and cyclic prefix (CP) insertion. In addition, when data is received, the baseband processor 5-20 divides a baseband signal provided from the RF processor 5-10, by the units of OFDM symbols, reconstructs signals mapped to subcarriers, through fast Fourier transform (FFT), and then reconstructs a reception bitstream through demodulation and decoding.

The baseband processor 5-20 and the RF processor 5-10 transmit and receive a signal as described above. Accordingly, the baseband processor 5-20 and the RF processor 5-10 may be called a transmitter, a receiver, a transceiver, a transceiving device, or a communication unit. Furthermore, at least one of the baseband processor 5-20 and the RF processor 5-10 may include a plurality of communication modules to support a plurality of different wireless access technologies. In addition, at least one of the baseband processor 5-20 and the RF processor 5-10 may include different communication modules to process signals in different frequency bands. For example, the different wireless access technologies may include wireless LAN (e.g., IEEE 802.11), a cellular network (e.g., LTE), etc. Furthermore, the different frequency bands may include a super high frequency (SHF) (e.g., 2.NRHz and NGHz) band, a millimeter (mm) wave (e.g., 60 GHz) band, etc.

The storage unit 5-30 stores data such as a basic program, an application program, and configuration information for an operation of the terminal. Particularly, the storage unit 5-30 may store information related to a second access node that performs wireless communication by using a second wireless access technology. The storage unit 5-30 provides stored data in response to a request of the controller 5-40.

The controller 5-40 controls overall operations of the terminal. For example, the controller 5-40 transmits or receives a signal via the baseband processor 5-20 and the RF processor 5-10. In addition, the controller 5-40 records and reads data in and from the storage unit 5-40. To this end, the controller 5-40 may include at least one processor. For example, the controller 5-40 may include a communication processor (CP) performing a control for communication, and an application processor (AP) controlling a higher layer, such as an application program. In addition, the controller 5-40 may control an operation of a terminal according to various embodiments of the disclosure or an entity corresponding thereto.

Figure 6:
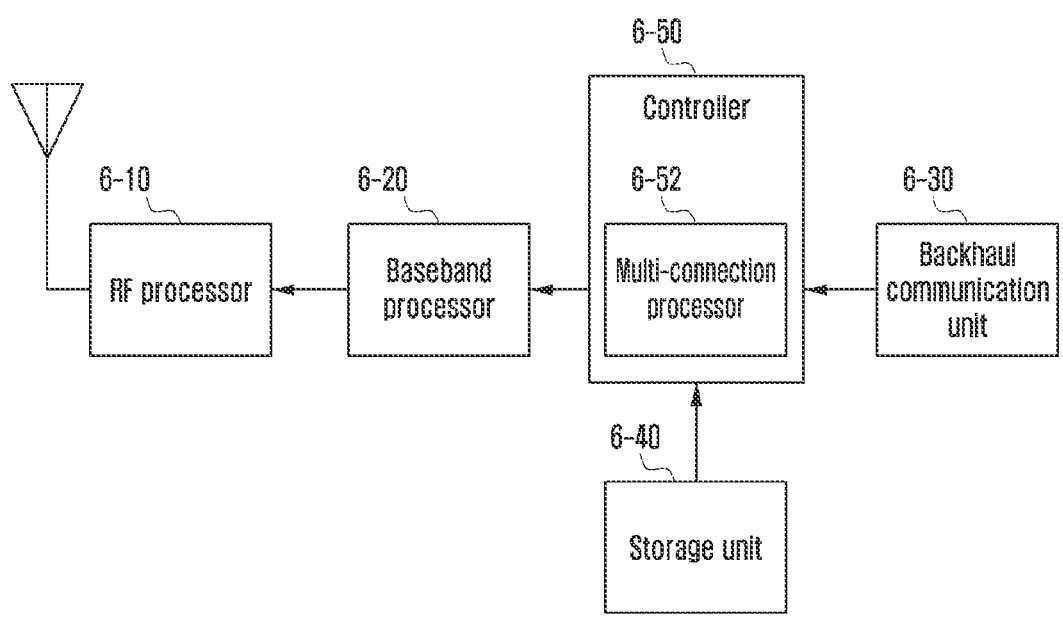
FIG. 6 is a block diagram illustrating a configuration of a base station according to an embodiment of the disclosure.

FIG. 6 is a block diagram illustrating a configuration of a base station according to an embodiment of the disclosure.

As illustrated in the diagram, the base station may include an RF processor 6-10, a baseband processor 6-20, a backhaul communication unit 6-30, a storage unit 6-40, and a controller 6-50. The controller 6-50 may further include a multi-connection processor 6-52.

The RF processor 6-10 performs a function, such as signal band change, amplification, etc., for transmitting or receiving a signal through a wireless channel. That is, the RF processor 6-10 upconverts a baseband signal provided from the baseband processor 6-20, into an RF band signal, and then transmits the RF band signal through an antenna, and downconverts an RF band signal received through the antenna, into a baseband signal. For example, the RF processor 6-10 may include a transmission filter, a reception filter, an amplifier, a mixer, an oscillator, a DAC, an ADC, and the like. In the diagram, only one antenna is illustrated, but the first access node may include a plurality of antennas. In addition, the RF processor 6-10 may include a plurality of RF chains. Furthermore, the RF processor 6-10 may perform beamforming. To perform the beamforming, the RF processor 6-10 may adjust the phase and size of each of signals transmitted or received via a plurality of antennas or antenna elements. The RF processor may perform a downlink MIMO operation by transmitting one or more layers.

The baseband processor 6-20 performs a function of conversion between a baseband signal and a bitstream according to a physical layer protocol of a first wireless access technology. For example, when data is transmitted, the baseband processor 6-20 generates complex symbols by encoding and modulating a transmission bitstream. In addition, when data is received, the baseband processor 6-20 reconstructs a reception bitstream by demodulating and decoding a baseband signal provided from the RF processor 6-10. For example, in a case where an OFDM scheme is applied, when data is transmitted, the baseband processor 6-20 generates complex symbols by encoding and modulating a transmission bitstream, maps the complex symbols to subcarriers, and then configures OFDM symbols through IFFT calculation and CP insertion. In addition, when data is received, the baseband processor 6-20 divides a baseband signal provided from the RF processor 6-10, by the units of OFDM symbols, reconstructs signals mapped to subcarriers, through FFT calculation, and then reconstructs a reception bitstream through demodulation and decoding. The baseband processor 6-20 and the RF processor 6-10 transmit and receive a signal as described above. Accordingly, the baseband processor 6-20 and the RF processor 6-10 may be called a transmitter, a receiver, a transceiver, a transceiving unit, a communication unit, or a wireless communication unit.

The backhaul communication unit 6-30 provides an interface for performing communication with other nodes within a network. That is, the backhaul communication unit 6-30 converts, into a physical signal, a bitstream transmitted from the base station to another node, for example, an auxiliary base station, a core network, etc., and converts a physical signal received from the other node, into a bitstream.

The storage unit 6-40 stores data such as a basic program, an application program, and configuration information for an operation of the base station. Particularly, the storage unit 6-40 may store information on a bearer assigned to a connected terminal, a measurement result reported from a connected terminal, etc. In addition, the storage unit 6-40 may store information serving as a determination criterion of whether to provide or stop providing multi-connection to a terminal. The storage unit 6-40 provides stored data in response to a request of the controller 6-50.

The controller 6-50 controls overall operations of the base station. For example, the controller 6-50 transmits or receives a signal via the baseband processor 6-20 and the RF processor 6-10, or via the backhaul communication unit 6-30. In addition, the controller 6-50 records and reads data in and from the storage unit 6-40. To this end, the controller 6-50 may include at least one processor. In addition, the controller 6-50 may control an operation of abase station according to various embodiments of the disclosure or an entity corresponding thereto.

In various embodiments of the disclosure, a case of the mention of dual connection may include both LTE-NR dual connectivity (ENDC) of a case where a core network is an evolved packet core (EPC) and multi-RAT dual connectivity (MRDC) of a case where a core network is a 5gc, and includes operations of a network and a terminal according to RATs of an MN and an SN, based on the connectivity.

Figure 7:
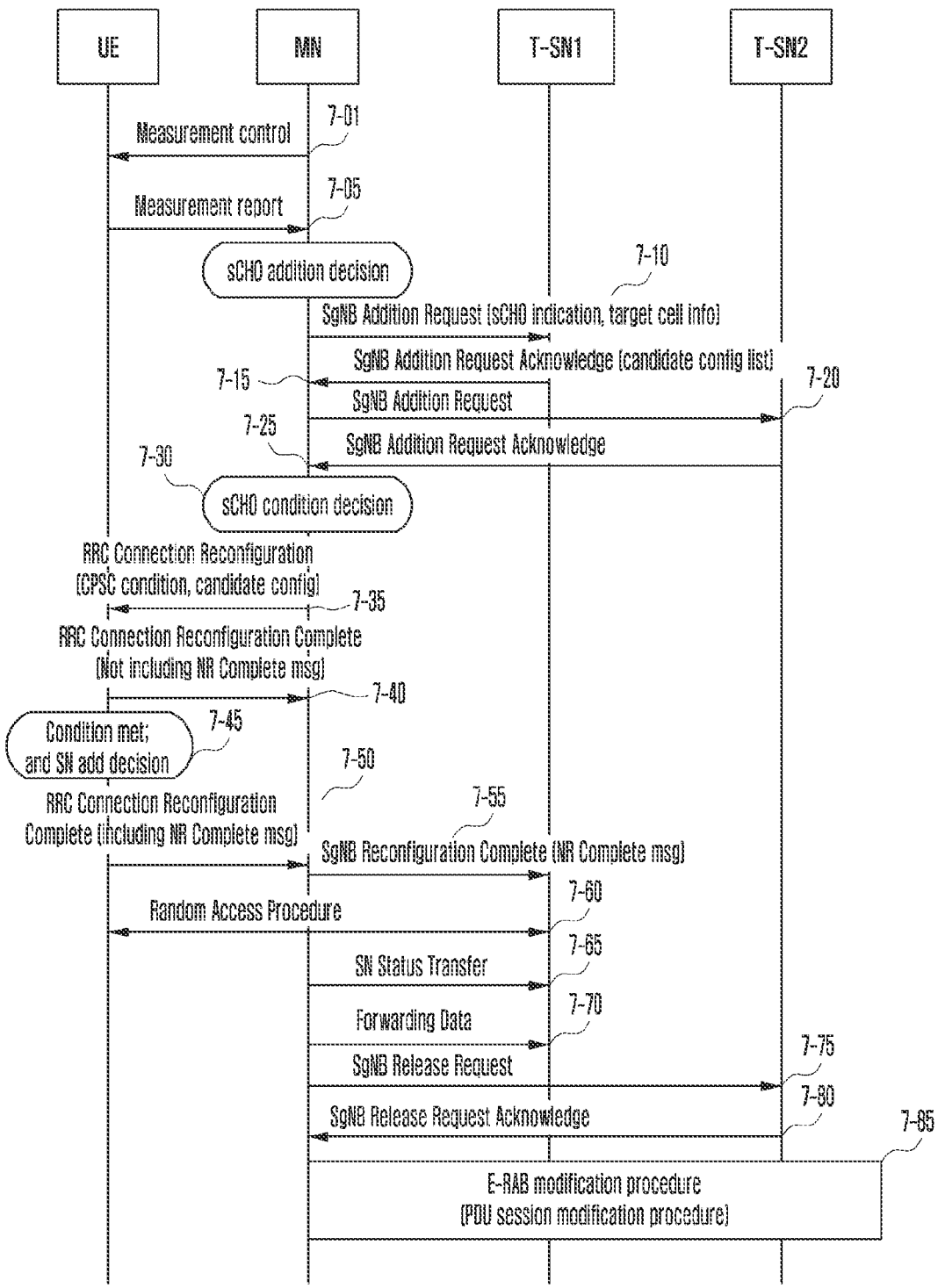
FIG. 7 is a diagram illustrating a procedure of conditional PSCell addition attempted by a master node (MN) according to an embodiment of the disclosure.

FIG. 7 is a diagram illustrating a procedure of conditional PSCell addition attempted by a master node (MN) according to an embodiment of the disclosure.

Referring to FIG. 7, a terminal is in a state of connection with an MN, and may transmit multi-RAT dual connectivity (MR-DC) capability to the MN. In addition, the terminal may transmit, to the MN, capability information or capability indicating that a conditional PSCell change is possible.

The MN having received the capability information may configure the terminal to measure a frequency of an SN node (operation 7-01). For example, the MN may transmit a measurement control message to the terminal. The terminal having received the measurement configuration measures the frequency of the SN node, and when a measurement reporting condition is satisfied, reports a measurement value to the MN (operation 7-05). The MN having received a measurement report from the terminal may determine conditional PSCell addition. For example, the MN having received a measurement report from the terminal may determine, based on the measurement report, whether to perform a conditional PSCell addition operation. When the MN performs a determination on PSCell addition, the MN may select a candidate target cell and a target SN (T-SN) operating the corresponding target cell.

The MN may transmit a base station addition request message to one or multiple T-SNs. For example, the base station addition request message may be an SgNBAdditionRequest message (operation 7-10). The SgNBAdditionRequest message may include at least one of a conditional PSCell addition or conditional PSCell change indicator, cell identification information (e.g., a cell ID, an ARFCN as frequency information, a physical cell ID, a cell group ID (CGI), etc.) of a cell selected as a candidate target of conditional PSCell addition, and cell group configuration information (e.g., CG-ConfigInfo). The PSCell addition or conditional PSCell change indicator may also be named a conditional handover indicator. In addition, the cell identification information of a cell selected as a candidate target, and the cell group configuration information may be named target cell information. In addition, all or some of the pieces of information may be named PSCell addition-related information or PSCell change-related information. T-SN1 having received the PSCell addition- or PSCell change-related information through the message may perform an admission control for a given target cell, or may neglect the given target cell and use measurement information of cells included in CG-ConfigInfo so as to perform an admission control for a particular cell operated by T-SN1. After performing the admission control, T-SN1 configures a list by associating a configuration value to be used in a corresponding target cell with each target candidate cell with respect to target cells having accepted conditional PSCell addition, and transfers the list to the MN (operation 7-15). For example, T-SN1 may transmit a base station addition request response message to the MN, and the response message may include information on the list. The base station addition request response message may be an SgNB addition request ack message. The SgNBAdditionRequestACK message may include an indicator indicating conditional PSCell addition. When the MN also transmits an SgNB addition request message to T-SN2, the operations performed between T-SN1 and the MN described above may be performed between the MN and T-SN2. That is, operations 7-20 and 7-25 may be identical to or correspond to operations 7-10 and 7-15, and the operations between T-SN1 and the MN and the operations between T-SN2 and the MN may be performed according to a pre-configured order or priority, or may be performed in parallel. The MN may determine a PSCell addition, PSCell change, or conditional handover condition, based on the SgNB addition request ack message. For example, when the MN finally receives responses to all SgNBAdditionRequests, the MN may determine, based on this information, a condition to perform addition for candidate cells for which conditional PSCell addition is possible (operation 7-30).

After the condition is determined, the MN may transmit, to the terminal, an RRC message including information (e.g., a conditional PSCell change (CPSC) condition or a conditional PSCell addition condition) on the determined condition, and candidate configuration information (e.g., candidate target PSCell config). Configuration information of a particular candidate target PSCell, and information on a condition to perform addition of the corresponding PSCell may be associated with one ID, and a list type in which multiple IDs, individual conditions, and PSCell configuration information are bound for multiple candidate target PSCells may be transmitted through the RRC message of the MN. The RRC message may be an RRC reconfiguration message or an RRC connection reconfiguration message, and the disclosure is not limited thereto. The RRC message transmitted by the MN may include, in a list type, source cell reconfiguration information (if needed) of the MN, candidates cells of conditional PSCell addition, node information based on a candidate T-SN ID, and pairs of configuration information to be used in a cell and condition information associated with this cell, and the RRC message may be transferred to the terminal. In this case, a condition and configuration information for a candidate cell may be included in an SN RRC container, or may be included in the RRC message of the MN (operation 7-35). In addition, some of the above pieces of information may be included in an SN RRC container, and some pieces of information may be included in the RRC message of the MN. For example, information received by the MN from an SN may be included in an SN RRC container, and information on a condition determined by the MN may be included in the RRC message of the MN.

The terminal having received the information on the determined condition and the candidate configuration information may transmit an RRC message to the MN. The RRC message may be an RRC reconfiguration complete message or an RRC connection reconfiguration complete message, and the disclosure is not limited thereto (operation 7-40). This message may be omitted. For example, when the RRC message is an RRC reconfiguration complete message, the corresponding message may not include an NR complete message. The NR complete message may be included and transmitted when a particular condition is satisfied later.

When a message of operation 7-35 is received, the terminal performs a compliance check of MN PCell configuration information, and configuration information of candidate cells of each T-SN, which exist in the corresponding message. The terminal may perform a measurement for evaluation of a corresponding condition, based on the compliance check. For example, when all information is compliant, a measurement for evaluation of a corresponding condition may be performed. In addition, the terminal may, based on pieces of information included in the message received in operation 7-35, perform a measurement and identify whether at least one cell among candidate cells satisfies a PSCell addition or PSCell change condition. When a condition is satisfied while a measurement is performed (operation 7-45), the terminal may determine to perform conditional PSCell addition, and select, as a target cell, a candidate cell associated with the satisfied condition. In addition, the terminal may also identify a T-SN operating a target PSCell.

Thereafter, the terminal may perform a random access to a corresponding target cell (operation 7-60), and transmit an RRC message to the MN (operation 7-50). Operations 7-50 and 7-60 may be concurrently performed or sequentially performed, and the order of the two operations is not limited in this embodiment. A random access operation may include the operations of transmitting a random access preamble (MSG1 transmission), receiving a random access response from a target cell (MSG2 reception), transmitting an uplink signal, based on a UL grant included in the random access response (MSG3 transmission), and receiving a message including information on contention resolution from the target cell (MSG4 reception). When a non-contention type random access is performed, operations corresponding to MSG3 and MSG4 may be omitted. The RRC message may be an MN RRC reconfiguration complete message (a case of NR DC) or an MN RRC connection reconfiguration complete message (a case of EN DC), and the disclosure is not limited thereto. For example, when an RRC reconfiguration complete message is used, the terminal may transmit the corresponding message to the MN to notify the MN that a conditional PSCell is performed (operation 7-50). This notification may be transferred through srb1 (or split srb1). The RRC reconfiguration complete message (outer message) may include an SN RRCreconfigurationComplete message (inner message) of an SN, and the SN RRC reconfiguration complete message may use a transaction ID made by a T-SN of a target cell. Alternatively, the RRC reconfiguration complete message (outer message) may include an SN RRC reconfigurationcomplete message (inner message), and a conditional configuration ID associated with a target PSCell of conditional PSCell addition made by the MN.

A ULInformationTransferMRDC message may be used as an outer message used in operation 7-50 instead of MN RRCReconfigurationComplete. In this case, similarly, as a message included in the message, an SN RRCReconfigurationComplete message required to be transferred to an added target PSCell, and a conditional configuration ID of conditional PSCell addition associated with the target PSCell may be included.

The MN having received a message in operation 7-50 may identify a T-SN, based on received information. For example, the MN may recognize a particular t-SN, based on a transaction ID of a T-SN, or distinguish a t-SN, based on a conditional configuration ID of a target PSCell of conditional PSCell addition. When the terminal transmits, to the MN, a corresponding message including ID information of a T-SN selected as a target, and a target cell ID (information on a candidate ID, or a conditional PSCell config ID, PCI, or CGI) in operation 7-50, the MN may recognize a particular T-SN, based on information included in the message. The MN may transmit a base station reconfiguration complete message to the identified T-SN (operation 7-55). For example, the message may be an SgNBReconfigurationComplete message. The MN may include an SN RRC reconfiguration complete message received in operation 7-50 in the SgNB Reconfiguration complete or ULInformationTransferMRDC message, and may transfer same to a T-SN selected as a target SN (operation 7-55). In this case, a separate RRC message may include an NR complete message so as to be transferred. In this embodiment, when PSCell addition or change is determined, the terminal performing a PSCell addition or change operation does not transmit an RRC reconfiguration complete message or an NR complete message to a selected PSCell, and transmits same to the MN, and the MN transfers information (an SN RRCReconfigurationComplete message) received from the terminal to a target PSCell or a T-SN controlling the target PSCell.

After performing operation 7-55, the MN may transmit, to the target SN, a sequence number (SN) status transfer message (operation 7-65), and attempt to perform data forwarding to the TARGET SN (operation 7-70). The MN may transmit base station release request messages (e.g., SgNB release request) to T-SNs failing to be selected, so as to release resources which have been reserved for conditional PSCell addition (operation 7-75). For example, the MN may perform operation 7-75 when the data forwarding operation is ended. A T-SN having received the SgNB release request message from the MN may transmit a base station release request response message (e.g., SgNB release request acknowledge) to the MN.

In another embodiment, the terminal may not include an NR RRCreconfigurationcomplete message in a message of operation 7-50, and transfer same to the MN. In this case, operation 7-55 may also not exist. Instead, the terminal may perform a random access to a target cell, and then, when the random access is successful, may transfer an NR RRCreconfigurationComplete message to the corresponding target cell.

Figure 8:
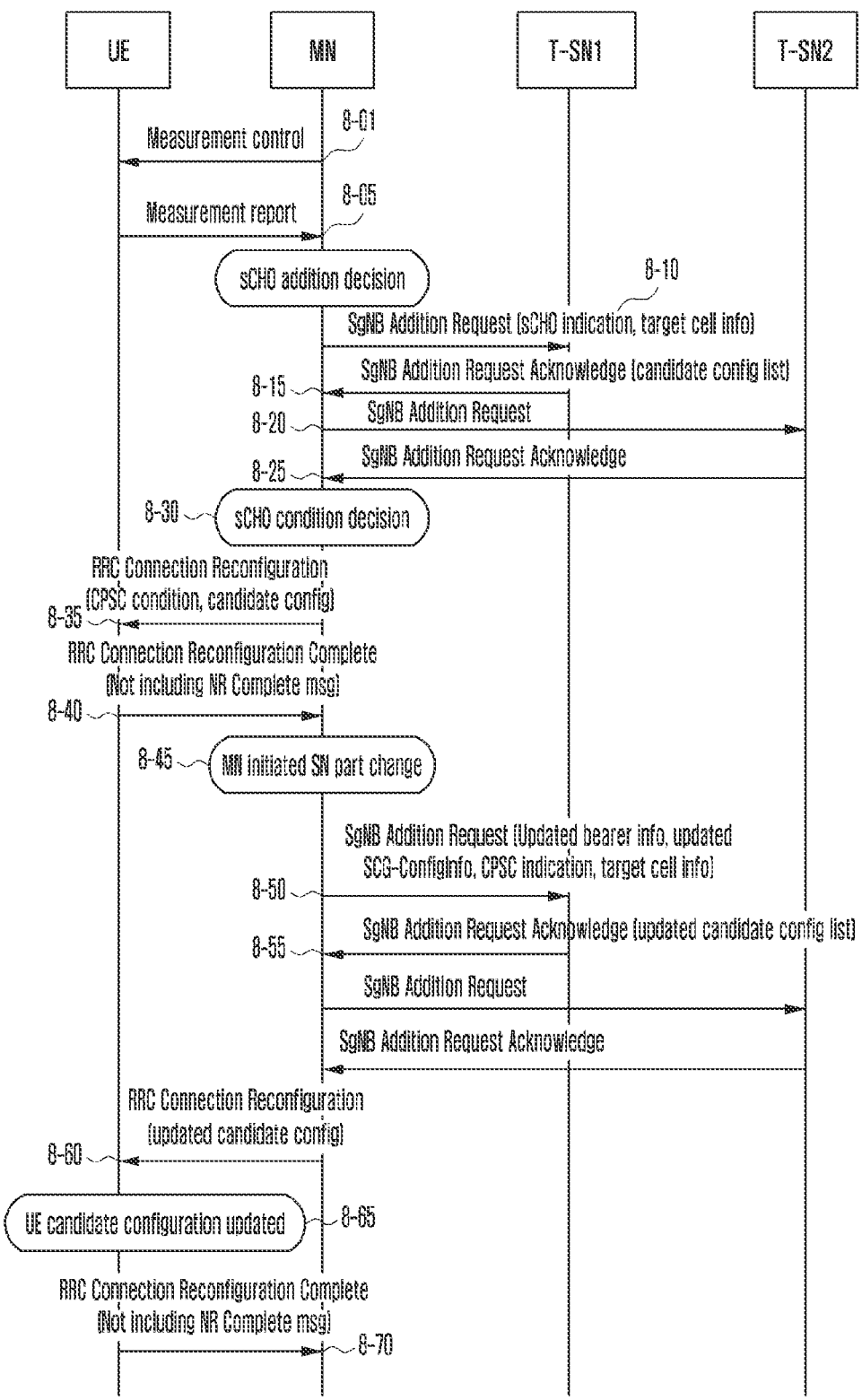
FIG. 8 is a diagram illustrating an update procedure of a case where an SN configuration is required to be changed after conditional PSCell addition attempted by an MN according to an embodiment of the disclosure.

FIG. 8 is a diagram illustrating an update procedure of a case where an SN configuration is required to be changed after conditional PSCell addition attempted by an MN according to an embodiment of the disclosure.

With reference to FIG. 8, a case where, in a situation where PSCell addition has been performed, source cell configuration information of an MN is changed, and when the information affects configuration information of a candidate target PSCell, candidate cell configuration information is updated will be described. A terminal is in a state of connection with an MN, and may transmit MR-DC capability to the MN. In addition, the terminal may transmit, to the MN, capability information or capability indicating that a conditional PSCell change is possible.

The MN having received the capability information may configure the terminal to measure a frequency of an SN node (operation 8-01). For example, the MN may transmit a measurement control message to the terminal. The terminal having received the measurement configuration measures the frequency of the SN node, and when a measurement reporting condition is satisfied, reports a measurement value to the MN (operation 8-05). The MN having received a measurement report from the terminal may determine conditional PSCell addition. For example, the MN having received a measurement report from the terminal may determine, based on the measurement report, whether to perform a conditional PSCell addition operation. When the MN performs a determination on PSCell addition, the MN may select a candidate target cell and a target SN (T-SN) operating the corresponding target cell.

The MN may transmit a base station addition request message to one or multiple T-SNs. For example, the base station addition request message may be an SgNBAdditionRequest message (operation 8-10). The SgNBAdditionRequest message may include at least one of a conditional PSCell addition or conditional PSCell change indicator, cell identification information (e.g., a cell ID) of a cell selected as a candidate target of conditional PSCell addition, and cell group configuration information (e.g., CG-ConfigInfo). The PSCell addition or conditional PSCell change indicator may also be named a conditional handover indicator. In addition, the cell identification information of a cell selected as a candidate target, and the cell group configuration information may be named target cell information. In addition, all or some of the pieces of information may be named PSCell addition-related information or PSCell change-related information. T-SN1 having received the PSCell addition- or PSCell change-related information through the message may perform an admission control for a given target cell, or may neglect the given target cell and perform an admission control for a particular cell operated by T-SN1. After performing the admission control, T-SN1 configures a list by associating a configuration value to be used in a corresponding target cell with each candidate cell with respect to target cells having accepted conditional PSCell addition, and transfers the list to the MN (operation 8-15). For example, T-SN1 may transmit a base station addition request response message to the MN, and the response message may include information on the list. The base station addition request response message may be an SgNB addition request ack message. When the MN also transmits an SgNB addition request message to T-SN2, the operations performed between T-SN1 and the MN described above may be performed between the MN and T-SN2. That is, operations 8-20 and 8-25 may be identical to or correspond to operations 8-10 and 8-15, and the operations between T-SN1 and the MN and the operations between T-SN2 and the MN may be performed according to a pre-configured order or priority, or may be performed in parallel. The MN may determine a PSCell addition, PSCell change, or conditional handover condition, based on the SgNB addition request ack message.

For example, when the MN finally receives responses to all SgNBAdditionRequests, the MN may determine, based on this information, a condition to perform addition for candidate cells for which conditional PSCell addition is possible (operation 8-30).

After the condition is determined, the MN may transmit, to the terminal, an RRC message including information (e.g., a conditional PSCell change (CPSC) condition) on the determined condition, and candidate configuration information (e.g., candidate config)(operation 8-35). The RRC message may be an RRC reconfiguration message or an RRC connection reconfiguration message, and the disclosure is not limited thereto. The RRC message transmitted by the MN may include, in a list type, source cell reconfiguration information (if needed) of the MN, candidates cells of conditional PSCell addition, node information based on a candidate T-SN ID, and pairs of configuration information to be used in a cell and condition information associated with this cell, and the RRC message may be transferred to the terminal. In this case, a condition and configuration information for a candidate cell may be included in an SN RRC container, or may be included in the RRC message of the MN (operation 8-35). In addition, some of the above pieces of information may be included in an SN RRC container, and some pieces of information may be included in the RRC message of the MN. For example, information received by the MN from an SN may be included in an SN RRC container, and information on a condition determined by the MN may be included in the RRC message of the MN.

In a case where T-SN configuration information needs to a reflection, such as a case where a source cell configuration of the MN causes establishment/change/release of a new DRB, a case where a DRB QoS configuration value is changed, or a case where security information used in the MN is changed, the MN may identify that configurations of a prepared T-SN and candidate cells are required to be changed, and may start an operation for change of the configurations of the prepared T-SN and candidate cells (operation 845). The prepared T-SN and candidate cells may be a candidate T-SN and candidate cells for PSCell addition, which are determined according to operations 8-10 to 8-30. In operation 8-45, when it is determined that a T-SN and candidate cells are required to be changed, the MN may transmit SgNBAdditionRequest messages to T-SNs prepared as target candidates (operation 8-50). The MN may include, in an SgNB Addition Request message, at least one of updated bearer information (add/modify/release), updated CG-ConfigInfo, and a conditional PSCell change/addition indicator, and transmit the message to a T-SN (or target cell). The T-SN (or target cell) may use the updated terminal information to include updated candidate configuration information in an SgNB addition request ack message and transmit same. The T-SN may generate the updated candidate configuration information, based on configuration information transferred in operation 8-15 or 8-25. For example, the T-SN may generate delta information based on previously transferred configuration information (configuration information provided in operation 8-15 or 8-25) for a candidate cell, input corresponding updated candidate configuration information in an SgNBAdditionRequestAck message, and transmit same to the MN.

The MN having received updated candidate configuration information transmits an RRC message including the updated candidate configuration information to the terminal (operation 8-60). The RRC message may be an MN RRC reconfiguration message or an RRC connection reconfiguration message, and the disclosure is not limited thereto. For example, the RRC reconfiguration message may include candidate cell-specific updated configuration information based on a candidate ID pre-configured by the MN.

The terminal having received the updated configuration information may update configuration information of a candidate cell (operation 8-65). For example, the terminal having received the RRC reconfiguration message may check a received candidate ID. When the candidate ID is identical to a candidate ID currently stored in the terminal, the terminal may consider, as delta information, information received in operation 8-60, based on pre-stored candidate cell configuration information, and may derive and store final configuration information of a candidate cell having the corresponding candidate ID (operation 8-65). That is, the terminal may apply newly received delta information to pre-stored candidate cell information so as to update candidate cell configuration information. When a new candidate ID exists in information received in operation 8-60, new candidate cell configuration information may be added. According to the above operation, the terminal may perform operation 8-65, and then transmit an RRC complete message to the MN (operation 8-70). The RRC complete message may be at least one of an RRC reconfiguration complete message or an RRC connection reconfiguration complete message, and the disclosure is not limited thereto. The RRC complete message may not include an NR complete message.

After the operation, the terminal may perform operations corresponding to operation 7-45 and subsequent operations in FIG. 7. Regarding detailed operations therefor, a configuration illustrated in FIG. 7 is referred to.

In another embodiment, messages of operations 8-50 and 8-55 may be new inter node messages rather than conventional inter node messages.

Figure 9:
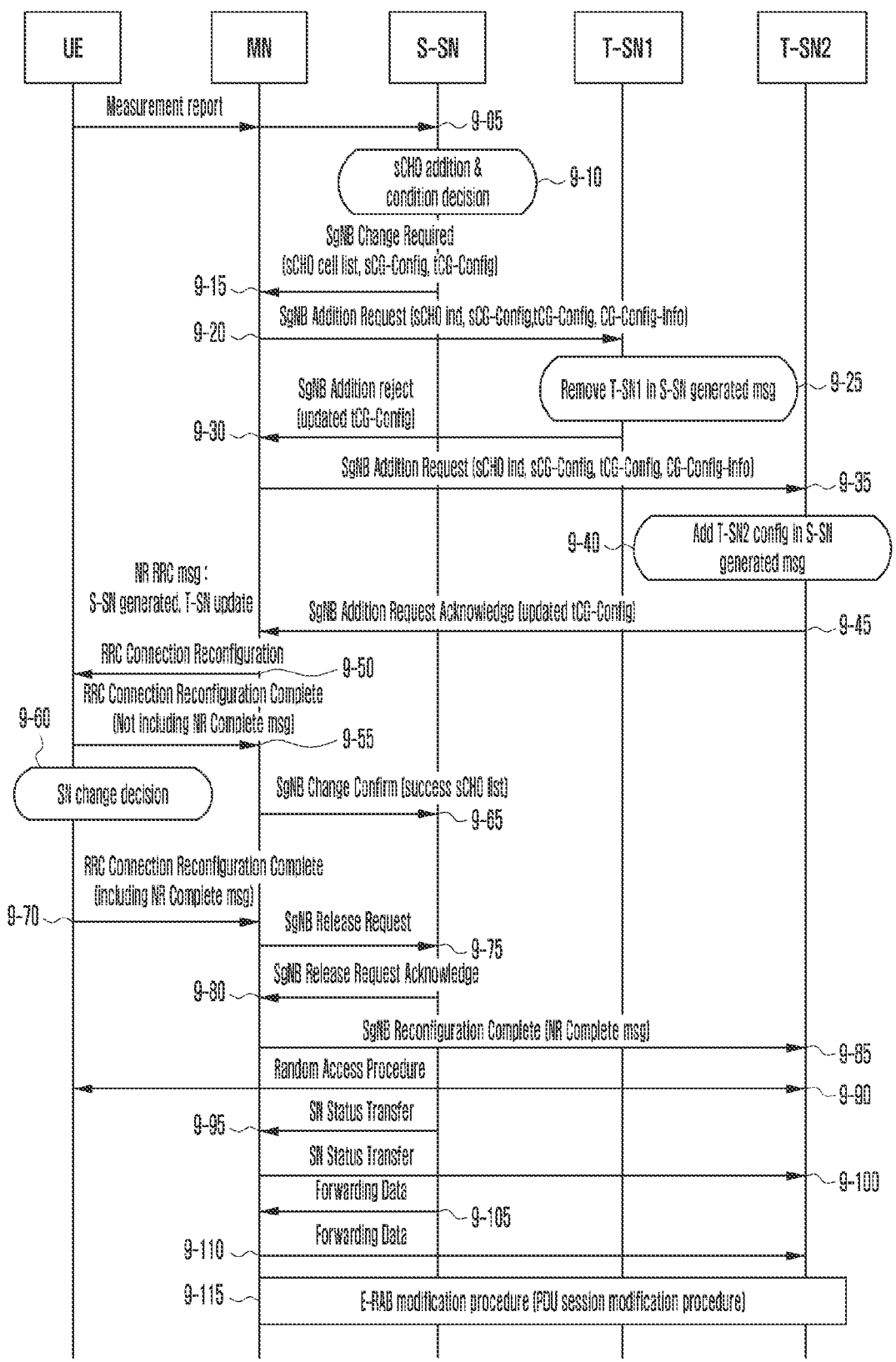
FIG. 9 is a diagram illustrating a procedure of a case of adding configuration information of a target-secondary node (T-SN) to a message made by a source-secondary node (S-SN), and changing a part required to be changed, among methods of conditional PSCell change attempted by an SN according to an embodiment of the disclosure.

FIG. 9 is a diagram illustrating a procedure of a case of adding configuration information of a target-secondary node (T-SN) to a message made by a source-secondary node (S-SN), and changing a part required to be changed, among methods of conditional PSCell change attempted by an SN according to an embodiment of the disclosure.

With reference to FIG. 9, a method of performing a conditional PSCell change in a situation where SN addition is ended is described. Specifically, this case may include a case of performing an operation in which a T-SN adds candidate cell configuration information of the T-SN to a message made by an S-SN according to an admission control, and maintains condition information, or removes condition information w % ben admission fails.

A terminal may transmit a measurement report to a T-SN or an S-SN (operation 9-05). The terminal may transmit a measurement report to an MN through a signaling radio bearer (SRB)1, and the MN may transfer the measurement report received from the terminal to an SN, or the terminal may directly transmit a measurement report to an SN by using an SRB3. The source SN (S-SN) may determine a conditional PSCell change (operation 9-10). The S-SN may determine to perform a conditional PSCell change (sCHO), based on the received measurement report, determine candidate cells, and determine a performing condition for each candidate cell. According to the determination of operation 9-10, the S-SN may transfer a base station change required message (e.g., SgNB change required message) to the MN (operation 9-15). The SgNB change required message may include at least one of a determined sCHO indication, an sCHO candidate cell list, a condition for each candidate cell, source cell group-configuration (sCG-Config) information including a current source configuration of the terminal, or source cell configuration information, and a target cell group-configuration (tCG-Config) that is a message made by the S-SN and including condition information. The current source cell configuration information may indicate source cell information that is currently applied to the terminal, or source cell information that the terminal receives from the S-SN and applies when a reconfiguration message of operation 9-50 is received. The MN having received the SgNB change required message and information included in same transmits a base station addition request message (e.g., SgNBAdditionRequest message) to each T-SN (operation 9-20). Information contained in this message may include at least one of an sCHO indicator, sCG-Config received from the S-SN, tCG-config, a target candidate ID list and a target candidate cell ID (PCI) list associated therewith, and CG-ConfigInfo that is terminal configuration information required by the MN from a corresponding T-SN. When the SgNB addition request message is received by T-SN1, T-SN1 may perform an admission control for a given candidate cell so as to determine an available candidate cell (operation 9-25). When T-SN1 determines to refuse a particular candidate cell, T-SN1 may decode received tCG-Config, that is, an SN RRC reconfiguration message made by the S-SN, and erase all information of conditions and candidate cell configurations associated with cells for which T-SN1 fails in admission. T-SN1 may encode the message again, add changed tCG-Config information in an SgNBAddition reject message, and transmit same to the MN (operation 9-30). Regarding an operation of a case where T-SN1 determines to allow a candidate cell, operation 9-45 is referred to. The MN may sequentially transmit an SgNBAdditionRequest message to T-SN2 that is another T-SN (operation 9-35). In addition, the MN may also transmit SgNB Addition request messages to different T-SNs in parallel. This message may include at least one of an sCHO indicator, sCG-Config, updated tCG-Config previously received from T-SN1, CG-ConfigInfo, and cell identification information including a candidate cell ID list included in T-SN2. T-SN2 having received the SgNB addition request message may perform an admission control to perform the admission control for a given candidate cell and determine an available candidate cell (operation 940). When T-SN2 determines to accept a particular candidate cell, T-SN2 may associate, with candidate cell configuration information made by T-SN2, an entry of a relevant condition included in an ID of an accepted candidate cell or an sCHO reconfiguration ID of the accepted candidate cell (this ID includes configuration and condition information for each sCHO candidate cell and indicates same) for an SN RRC reconfig message made by the S-SN (when a sequential SN addition request is requested, this message may indicate an updated tCG-Config message received from a previous T-SN, and when a parallel SN addition request is requested, this message may indicate a tCG-Config message received in operation 9-15), and add same to tCG-Config. The additional operation may correspond to an operation in which T-SN2 decodes a received tCG-Config message, and adds a configuration part made by T-SN2 for an sCHO candidate cell accepted by T-SN2 in an sCHO reconfiguration ID list (i.e., scho-ToAddModList) contained in the corresponding message according to a result of an admission control, and the additional operation is not limited thereto (for example, include the T-SN generated part in the octet string defined for the concerned sCHO candidate within scho-ToAddModList). This configuration information may be delta configuration information based on configuration information of the S-SN. A case where the T-SN refuses sCHO may correspond to an operation in which T-SN2 removes sCHO refused by T-SN2 from an sCHO reconfiguration ID list contained in tCG-Config (for example, remove the sCHO from the scho-ToAddModList). T-SN2 may encode again a resulting configuration obtained through addition or removal by T-SN2 to make an RRC message, and this message may correspond to updated tCG-Config.

T-SN2 may add tCG-Config information updated as described above in a base station addition request response message (e.g., SgNB addition request ack message) and transfer same to the MN (operation 945). When a sequential request is requested to a T-SN, the MN having received a last SgNB addition request ack message among response messages for given requests may make a reconfiguration message (e.g., SN RRC reconfiguration message), based on sCG-Config previously received from the S-SN, and tCG-Config received in operations 9-30 and/or 9-45. The SN reconfiguration message may be initially generated by the S-SN, and may be updated by a T-SN. The MN may include an SN reconfiguration message in an MN RRC reconfiguration (or RRC connection reconfiguration) message, and transfer same to the terminal (operation 9-50). This case may correspond to a case of a signal structure diagram of FIG. 11A. That is, the MN RRC reconfiguration msg includes an SN RRCreconfiguration message made by the S-SN. A part made by the S-SN and a part made by a T-SN are paired for each sCHO candidate ID. The part made by a T-SN may be included in a separate container, or may be configured by octet strings. This signal structure is the same as a structure of an MN RRC reconfiguration message made by the MN when sCHO configuration information is transferred to the terminal, as made in FIG. 10. That is, an MN RRCreconfiguration message includes an SN RRC reconfiguration message, and again, this SN RRC reconfiguration message may be divided into a part including security information and an sCHO performing condition made by the S-SN, and a part including sCHO configuration information for each candidate cell made by a T-SN.

The terminal having received the MN RRC reconfiguration message may update source cell configuration information by using a delta scheme when reconfiguration information of the S-SN is in the SN RRC reconfiguration message. Moreover, at the same time, the terminal may receive candidate cell IDs, conditions, pieces of candidate configuration information of T-SNs, and store same in the terminal. The terminal may perform a compliance check of a given MN RRCreconfiguration and a source configuration of the SN, and condition/target cell configuration information for sCHO. When a result of compliance check of all configuration information has no problem, the terminal may store configuration information for the candidate cells, and then transfer an MN RRC reconfiguration complete message (or RRC connection reconfiguration complete message) to the MN (operation 9-55). The MN having received this message may transfer a base station change confirmation message (e.g., SgNB change confirm message) to the S-SN (operation 9-65). The SgNB change confirm message may include information on an sCHO candidate cell list (i.e., sCHO candidate cell IDs (sCHO reconfiguration IDs) transferred through the message of operation 9-50) of cells successfully added to the terminal, or cells, configuration information of which is updated. This information may correspond to a candidate ID, a PCI, a CGI, or a t-SN ID operating a corresponding cell for each candidate cell. In another embodiment, when a terminal satisfies a given condition to determine an SN change, performs sCHO for a corresponding determined target cell, and transmits a complete message (e.g., an SN reconfiguratoincomplete message), a target node (T-SN2) may transmit an sCHO success message to the MN, and the MN having received this message may transfer an SN change confirm message to the S-SN. In this case, the S-SN may additionally transfer an SN release request ack to the MN, and request release of context of the S-SN. In this case, an SN reconfiguration complete (operation 9-85) message may not be required. Instead, when the terminal transmits an SN reconfigurationcomplete message to corresponding T-SN2 or after the transmission is successful, the terminal may transmit an MN RRC connection reconfiguration complete message to the MN. This message may has the same role as a message transmitted in operation 9-70, and include the same content as the message. As methods of transmitting the message transmitted in operation 9-70, a method of transmitting the message when a condition is satisfied (i.e., when conditional PSCell change/addition is performed) and a method of transmitting the message of operation 9-70 after conditional PSCell change/addition is successfully performed may coexist. The above operation may be considered when a corresponding PSCell is to be added or changed according to satisfaction of a given condition in all cases of MN-initiated Pscell addition, SN-initiated Pscell change, and MN-initiated Pscell change.

When the terminal satisfies a given condition, the terminal may determine an SN change, and determine, as a target cell, a candidate cell related to the condition (operation 9-60). The terminal performs a random access to a target cell of a corresponding target SN (operation 9-90). In addition, the terminal may transmit an MN RRC message (e.g., an RRC connection reconfiguration complete message or ULInformationTransferMRDC) to the MN so as to notify the MN that a conditional PSCell is performed (operation 9-70). As a message included in the MN RRC message, an SN RRC reconfigurationcomplete message or a measurement report message may be used. Together with the message, information on a configuration ID for conditional PSCell change transferred from the MN in operation 9-50. When an MR is included, a measurement ID, the MR of which has been triggered, may indicate one of previously given conditions configured for conditional PSCell change/addition, and the S-SN may notify, through the MR, a particular target PSCell that a conditional change is performed. Any type of MN RRC/SN RRC messages may be transferred through an srb1 (or split srb1). Operation 9-70 and operation 9-90 may be sequentially performed or performed in parallel. The MN RRC reconfiguration complete message includes an SN RRCreconfigurationComplete message of the SN in an octet string type. The SN RRCreconfigurationcomplete message may be made as a response message for an SN RRC message including sCHO configuration information of a target cell of a particular T-SN selected for performing of sCHO in operation 9-60 by using a transaction ID of the SN RRC message. The MN may identify a target cell and a target node for which sCHO is performed, through an SN RRC reconfiguration complete message included in an MN RRC reconfiguration complete message, or may identify the same cell and node when the MN receives an MN RRCreconfigurationcomplete message transmitting a candidate ID or PCI/CGI information of a cell selected as a target, or a conditional reconfiguration ID value assigned to each candidate target PSCell of a conditional PSCell change assigned by the MN in operation 9-50. The MN having received the message (transaction ID or selected cell ID) of operation 9-70 may transmit an SgNB release request message to the S-SN (operation 9-75), and receive an SgNB release request ack message from the S-SN (operation 9-80). Thereafter, the MN may recognize a particular t-SN, based on a transaction ID of a selected T-SN, or when information on an ID of a T-SN selected by the terminal as a target and a target cell ID (candidate ID, or information of PCI or CGI) is included in an RRCreconfigurationcomplete message received in operation 9-70, the MN may recognize a particular t-SN, based on this information, and transmit an SgNBReconfiguration-Complete message to the corresponding selected t-SN (operation 9-85). The SgNB reconfiguration complete message may include an NR complete message received from the terminal.

Thereafter, the S-SN may transmit a SN status transfer to the MN, and the S-SN may transfer same to T-SN2 corresponding to the target cell. The S-SN may perform data forwarding to the MN, and the MN may forward the data received from the S-SN to T-SN2. After the MN transmits the SNstatusTransfer, and performs data forwarding, the MN may allow the S-SN to perform a UE context release.

In another embodiment, when an MN RRCreconfigurationComplete message is transferred to the MN after the terminal determines to perform sCHO, the message may not include an NR RRCreconfigurationcomplete message. Instead, the terminal may perform a random access to a target cell, and then, when the random access is successful, may transfer an NR RRCreconfigurationComplete message to the corresponding target cell.

Figure 11:
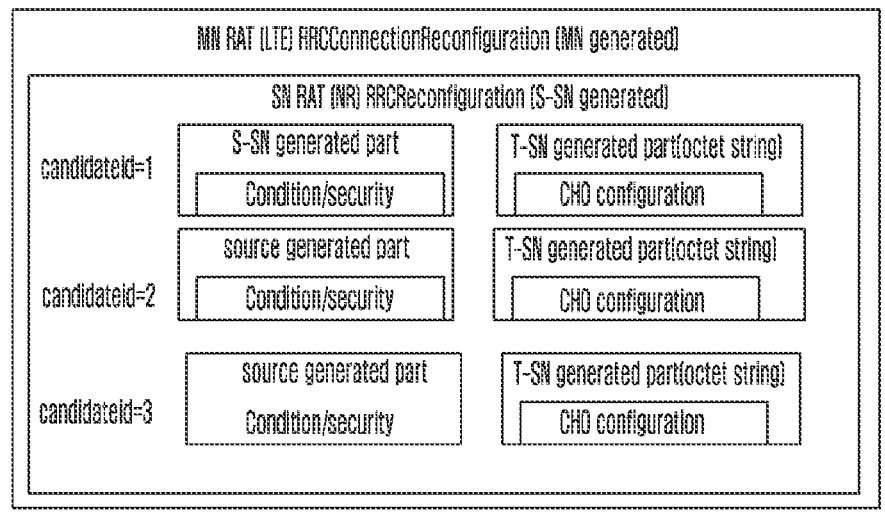
FIG. 11 is a diagram illustrating a structure of a radio resource control (RRC) reconfiguration signal made by each method of conditional PSCell change according to an embodiment of the disclosure.
Figure 11:
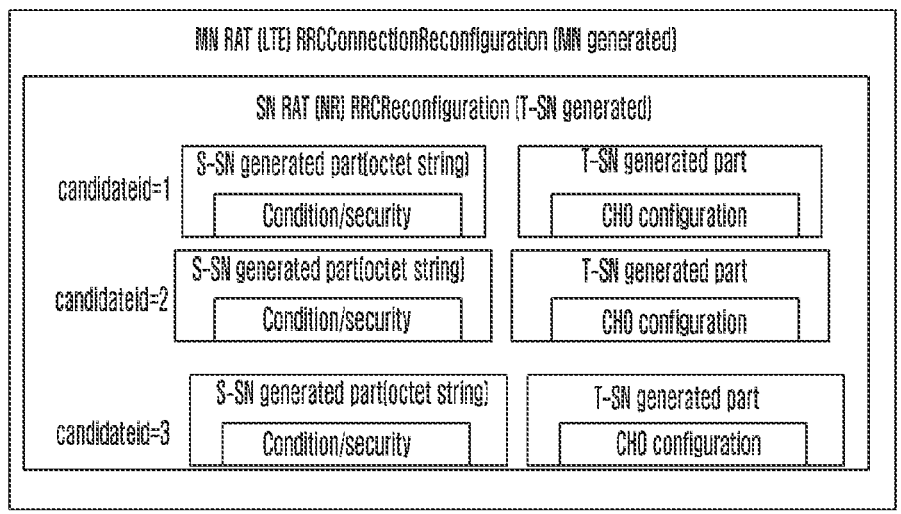

As another embodiment, in operation 9-15, when the SN transfers a current source configuration of the SN to the MN through a container or octet strings, the MN may transfer the configuration to a T-SN so that the configuration is included as a container of an SN RRC reconfiguration message made by the T-SN. When the SN RRC reconfiguration message made by the T-SN is transferred back to the MN, the MN may encapsulate the SN RRC reconfiguration message in an RRC reconfiguration message of the MN, and transparently transfer the message to the terminal. Each of the message of operation 9-15 and the message of operation 9-20 is required to include a source cell configuration and condition made by the S-SN, and the message of operation 9-30 or the message of operation 9-45 is required to include a container of source cell configuration information made by the S-SN and sCHO configuration information as a T-SN part in an RRC reconfiguration message made by the T-SN. This case may correspond to a case of a signal structure diagram of FIG. JI B. That is, as an MN RAT-based message transferring sCHO configuration information to the terminal, an RRC reconfiguration message made by MN RAT-based RRC includes an SN RAT-based RRC reconfiguration message made by a T-SN as illustrated in FIG. 11B. In this message, again, an sCHO candidate ID, a part made by the S-SN, and a part made by the T-SN may be included to be linked each other by one entry. The part made by the S-SN contains security information for a source cell and an sCHO condition made by the S-SN in a separate container or an octet string type, and the part made by the T-SN contains sCHO configuration information used in a cell having an corresponding associated sCHO candidate ID.

As another case, the S-SN transfers, to the MN, information on an sCHO condition determined thereby, and source cell configuration information as a container, the MN transfers again the source cell configuration information to each T-SN, and the T-SN makes sCHO configuration information, based on the received source cell configuration information, and also transfers the sCHO configuration information to the MN in a container type. The MN receives all responses to SgNB addition request messages transmitted by the MN, and then configures, in an NR RRC reconfiguration, containers of sCHO candidates of a selected T-SN, a source cell container made by the S-SN, and condition list information made by the S-SN. The MN may configure a final SN RRC reconfiguration message while maintaining only a condition list for selected sCHOs, and may encapsulate the message in an MN RRC reconfiguration and transmit same to the terminal.

Figure 10:
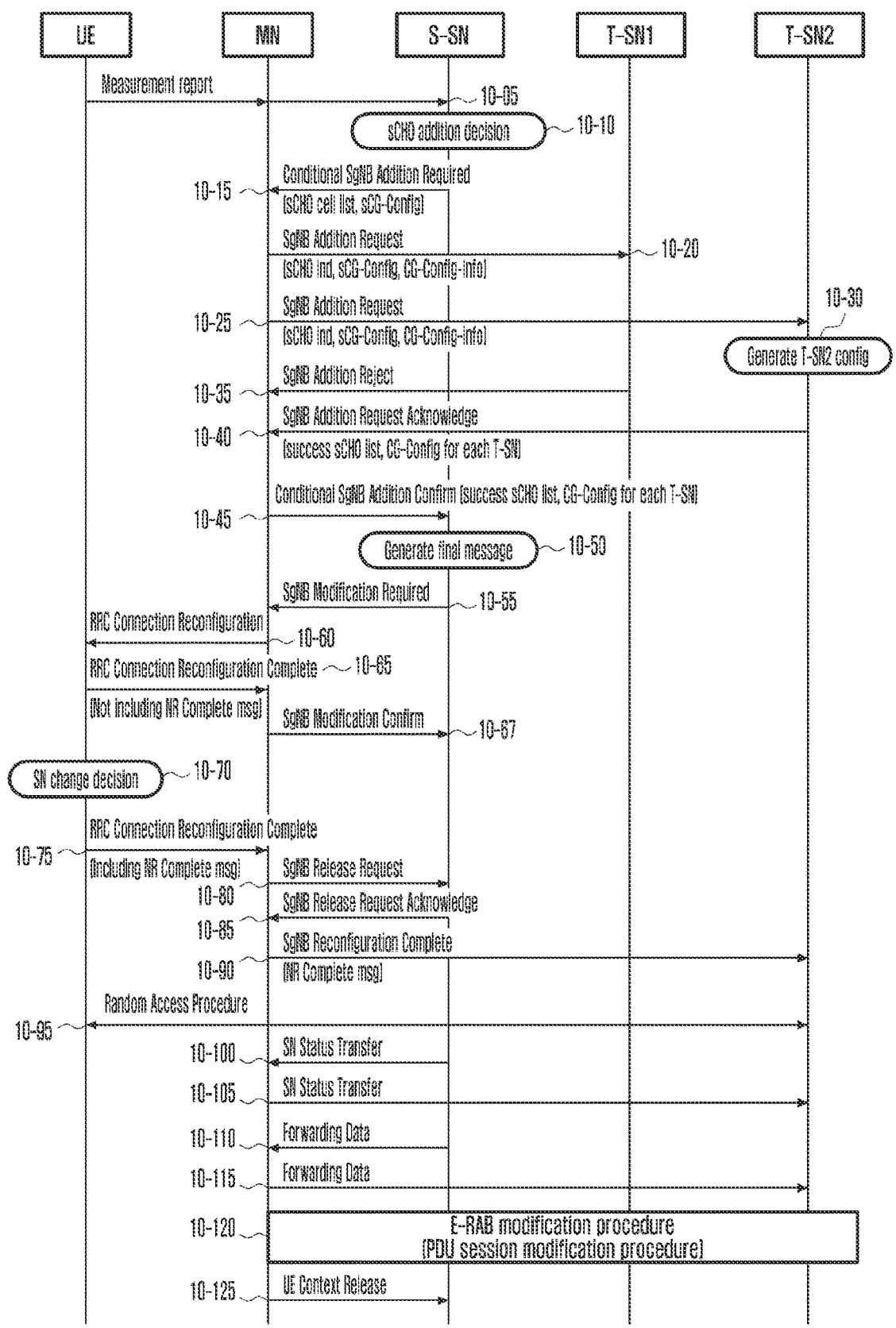
FIG. 10 is a diagram illustrating a procedure of a case where an MN transfers again, to an SN, candidate configuration information received from a T-SN, and the SN makes a final NR RRC reconfiguration message, among methods of conditional PSCell change attempted by the SN according to an embodiment of the disclosure.

FIG. 10 is a diagram illustrating a procedure of a case where an MN transfers again, to an SN, candidate configuration information received from a T-SN, and the SN makes a final SN RRC reconfiguration message, among methods of conditional PSCell change attempted by the SN according to an embodiment of the disclosure.

With reference to FIG. 10, a method of performing a conditional PSCell change in a situation where SN addition is ended is described. Specifically, this case may include a case where an S-SN transmits condition information and configuration information of a terminal to a T-SN, the T-SN transmits again configuration information of a candidate cell to the S-SN, and finally, the S-SN makes an SN RRC reconfiguration message and transfers again the message to the terminal via the MN.

A terminal may transmit a measurement report to a T-SN or an S-SN (operation 10-05). The terminal may transmit a measurement report to an MN through a signaling radio bearer (SRB)1, and the MN may transfer the measurement report received from the terminal to an SN, or the terminal may directly transmit a measurement report to an SN by using an SRB3. The source SN (S-SN) may determine a conditional PSCell change (operation 10-10). The S-SN may determine to perform an sCHO (conditional PSCell change), based on the received measurement report, determine candidate cells, and determine a performing condition for each candidate cell.

According to the determination of operation 10-10, the S-SN transfers a conditional SgNB addition required message to the MN (operation 10-15). This message may include at least one of a determined sCHO indicator, an sCHO cell list, a condition for each candidate cell, and sCG-Config information including a current source configuration of the terminal. The MN may check an sCHO cell list received from the message, select T-SNs, and transmit SgNBAdditionRequest messages to selected T-SN1 and T-SN2 (operations 10-20 and 10-25). Each of the messages may include at least one of an sCHO indication, sCG-Config received from the S-SN, CG-ConfigInfo, and sCHO candidate cell ID list information. In addition, the messages may be transmitted to different T-SNs independently or parallelly. That is, operations 10-20 and 1-25 may be performed in parallel regardless of an order, and when there are priorities, an operation may be first performed for a particular T-SN according to the priorities.

When T-SN1 determines a rejection in an admission control, T-SN1 may transmit an SgNB addition reject message to the MN (operation 10-35). Regarding a description of the rejection, a corresponding configuration of FIG. 9 may be referred to.

When T-SN2 having received an SgNB addition request message succeeds in an admission control, T-SN2 makes sCHO configuration information for a corresponding indicated sCHO candidate cell (operation 10-30). T-SN2 may transfer again the generated sCHO information to the MN through an SgNBAdditionRequestAck message (operation 10-40).

The MN may obtain, according to the above operation, accept/reject information for an SgNBAdditionRequest message transmitted by the MN, and configuration information (OCTET strings or a dedicated container) of an sCHO candidate cell transferred together with the information, and transfer the obtained information to the S-SN (operation 10-45). In order to transfer the obtained information, a conditional SgNB addition confirm message may be used. The conditional SgNB addition confirm message may include at least one of an sCHO candidate cell list (this may be a PCI list or a list of candidate IDs) of cells which successfully prepare for sCHO and are accepted as sCHO, and tCG-Config information of each of successful sCHOs.

When the S-SN receives a conditional SgNB addition confirm message, the S-SN may determine a condition for an sCHO candidate cell (this determination of the condition may be done when the S-SN initially determines to perform sCHO, or may be additionally changed), and may make a list in which source configuration information of the S-SN, sCHO configuration information, and the condition are associated with a candidate ID. The S-SN may make a collection of source configuration information and sCHO configuration information into an SN RRC reconfiguration message (operation 10-50), and may add the message to an SgNB Modification required message and transfer same to the MN (operation 10-55). When the MN receives this message, the MN may add the SN RRC reconfiguration in an MN RRC reconfiguration msg and transfer same to the terminal (operation 10-60). Operation 10-60 and a sub process thereafter may be the same as operation 9-50 and subsequent operations illustrated in FIG. 9.

In another embodiment, in a situation where message 10-15 operation to operation 10-40 are applied in the same way and operations of each node are the same, without operation 10-45 corresponding to a process of transferring corresponding pieces of information to the S-SN, and operations 10-50 and 10-55 corresponding to a process of making a final message by the S-SN, the MN may collect pieces of condition information received from the S-SN and configuration information of candidate target PSCells for which admission controls are performed, which is received from a T-SN, and may transfer the collected information to the terminal. In this case, operation 10-60 may start again. RRC of the MN may map a condition of the S-SN and configuration information of a candidate PSCell for which an admission control is performed, and may generate an SN RRC message including radio bearer configuration information generated in the MN. The MN or RRC of the MN may include the generated message in an MN RRC connection reconfiguration message, and may use a separate container for MN RRC connection reconfiguration without an SN RRC message and transfer same to the terminal.

The terminal having received the MN RRC reconfiguration message may update source cell configuration information by using a delta scheme when reconfiguration information of the S-SN is in an SN RRC reconfiguration message. In addition, at the same time, the terminal may receive candidate cell IDs, conditions, and pieces of candidate configuration information of T-SNs, and store same in the terminal. After storing configuration information of the candidate cells, the terminal may transfer an RRC reconfiguration complete message to the MN (operation 10-65). The MN having received the message may notify, through an SgNB Modification Confirm message, the S-SN that transfer of sCHO configuration information has succeeded (operation 10-67).

When the terminal satisfies a given condition, the terminal may determine an SN change, and determine, as a target cell, a candidate cell related to the condition (operation 10-70). The terminal performs a random access to a target SN of the corresponding target cell (operation 10-95). In addition, the terminal may transmit an MN RRC reconfiguration message to the MN so as to notify the MN that a conditional PSCell is performed (operation 10-75). This notification may be transferred through srb1 (or split srb1). Operation 10-75 and operation 10-95 may be sequentially performed or performed in parallel. The MN RRC reconfiguration complete message may include an SN RRCreconfigurationComplete message of the SN, and the SN RRC reconfiguration complete message may use a transaction ID made by a T-SN of the target cell. The MN having received the message of operation 10-75 may transmit an SgNB release request message to the S-SN (operation 10-80), and receive an SgNB release request ack message from the S-SN (operation 10-85). Thereafter, the MN may recognize a particular T-SN, based on a transaction ID of a selected T-SN, or when information on an ID of a T-SN selected by the terminal as a target and a target cell ID (candidate ID, or information of PCI or CGI) is included in an RRCreconfigurationcomplete message received in operation 10-75, the MN may recognize a particular T-SN, based on this information, and transmit an SgNBReconfigurationComplete message to the corresponding T-SN (operation 10-90). The SgNB reconfiguration complete message may include an NR complete message received from the terminal.

After receiving the SgNB Release request message, the S-SN may transmit an SNstatus transfer to the MN (operation 10-100). The MN having received the message transmits the SN status transfer to an sCHO target node again (operation 10-105).

After transmitting the SN status transfer, the S-SN performs data forwarding to the MN (operation 10-110), and the MN also performs data forwarding to the target SN (operation 10-115). After transmitting the SNstatusTransfer and performing data forwarding, the MN may perform an E-RAB modification procedure after data forwarding (operation 10-120), and may allow the S-SN to perform a UE context release (operation 10-125).

Figure 12:
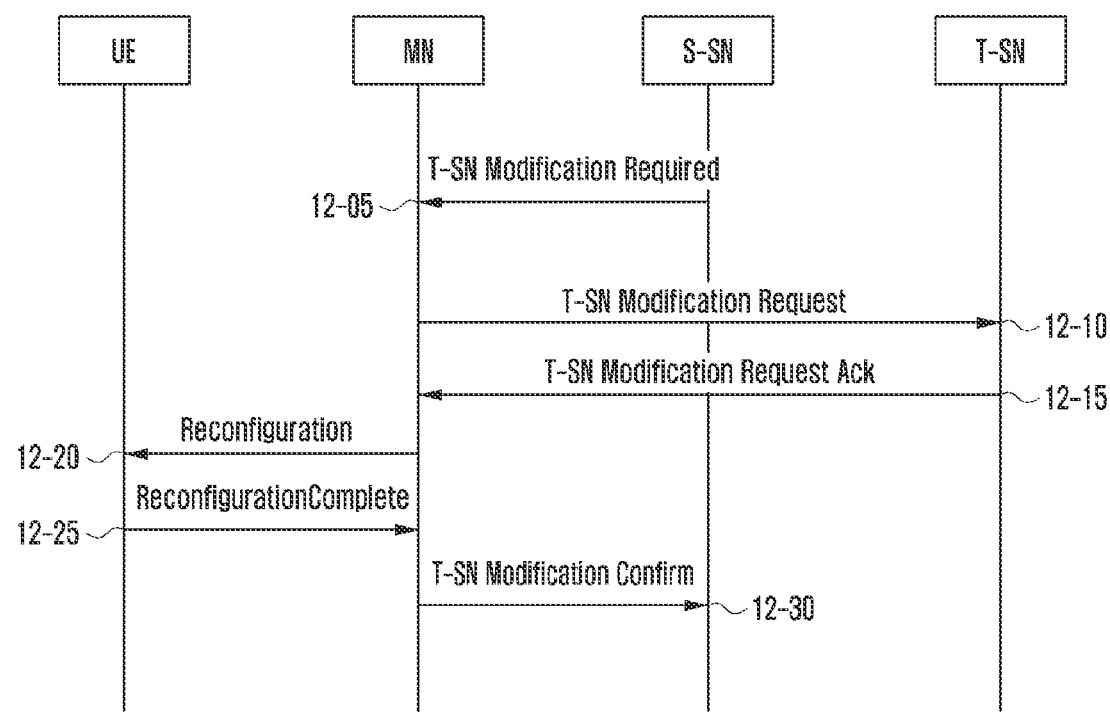
FIG. 12 is a diagram illustrating a procedure of a case of performing an S-SN initiated T-SN modification when a T-SN adds/removes configuration information of the T-SN to/from a message made by an S-SN according to an embodiment of the disclosure.

As another embodiment of the disclosure, FIG. 12 is a diagram illustrating a procedure of a case of performing an S-SN initiated T-SN modification when a T-SN adds/removes configuration information of the T-SN to/from a message made by an S-SN, as illustrated in FIG. 9. Messages and an operation order between each terminal and node correspond to those of FIG. 9 unless otherwise stated.

This case corresponds to a case where, in a situation where a configuration and conditions for a particular sCHO candidate target cell are configured for a terminal in advance, when a configuration value related to the pre-configured candidate target cell is changed, an S-SN triggers the corresponding change. In operation 12-05, when it is determined that a source cell configuration is changed and this change causes a change in a pre-configured candidate target cell configuration, an S-SN transfers a T-SN modification required message to an MN. The T-SN modification required message may include information which is the same as the message transmitted in operation 9-15 of FIG. 9 (or at least one piece of information among pieces of information included in the message transmitted in operation 9-15), and may be transferred to the MN. When the T-SN modification required message is received, the MN transfers a T-SN modification request message to a T-SN of pre-configured candidate cells (operation 12-10). The T-SN modification request message may include information which is the same as the message transmitted in operation 9-20 of FIG. 9 (or at least one piece of information among pieces of information included in the message transmitted in operation 9-20).

The T-SN having received the T-SN modification request message may make configuration information of a new candidate cell. The T-SN may generate or update configuration information of a new candidate cell by using a delta signal based on "configuration information of a source cell" received from the T-SN modification request message. In another embodiment, the T-SN may generate or update new candidate cell configuration information by using a delta signal based on configuration information of an existing candidate cell rather than configuration information of a source cell. The updated configuration information of the candidate cell may be loaded in a T-SN modification request ack message and transferred to the MN again (operation 12-15). The T-SN modification request ack message may include information which is the same as information of the message transmitted in operation 9-45 of FIG. 9 (or at least one piece of information among pieces of information included in the message transmitted in operation 9-25).

The MN having received the T-SN modification request ack message may include updated T-SN candidate configuration information in an MN RRC reconfiguration message, and transfer same to a terminal (operation 12-20). The T-SN candidate configuration information may be included in the MN RRC reconfiguration message in a type of octet strings. When the terminal receives the information, performs a compliance check of the information, and a result of the check has no problem, the terminal may update configuration information of a candidate cell, which the terminal has, to information received in operation 12-20. In addition, the terminal transfers an MN RRC reconfiguration complete message to the MN (operation 12-25). When the MN receives the MN RRC reconfiguration complete message, the MN may transfer a T-SN modification confirm message implying sCHO configuration completion to the S-SN (operation 12-30).

Figure 13:
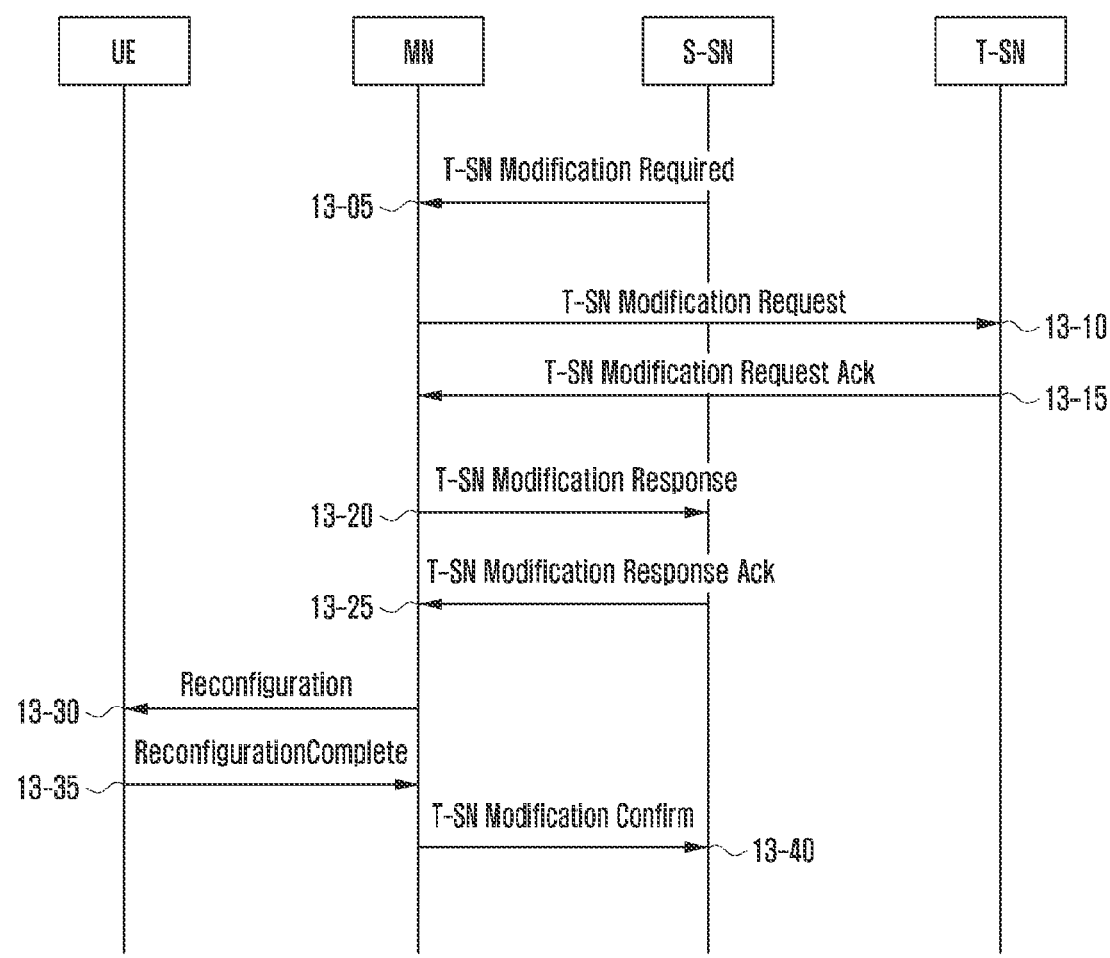
FIG. 13 is a diagram illustrating a procedure of a case of performing an S-SN initiated T-SN modification when an MN transmits again, to an S-SN, configuration information of a candidate cell, which is received from a T-SN, and the S-SN makes a final SN RRC reconfiguration message and transmits same to the MN according to an embodiment of the disclosure.

In another embodiment of the disclosure, FIG. 13 is a diagram illustrating a procedure of performing an S-SN initiated T-SN modification when an MN transmits again, to an S-SN, configuration information of a candidate cell, which is received from a T-SN, and the S-SN makes a final SN RRC reconfiguration message and transmits same to the MN, as additional signals in FIG. 10. Messages and an operation order between each terminal and node correspond to those of FIG. 10 unless otherwise stated. This case corresponds to a case where, in a situation where a configuration and conditions for a particular sCHO candidate target cell are configured for a terminal in advance, when a configuration value related to the pre-configured candidate target cell is changed, an S-SN triggers the corresponding change.

When it is determined that a source cell configuration is changed and this change causes a change in a pre-configured candidate target cell configuration, an S-SN transfers a T-SN modification required message to an MN (operation 13-05). The T-SN modification required message may include information which is the same as the message of operation 10-15 of FIG. 10 (or at least one piece of information among pieces of information included in the message transmitted in operation 10-15), and may be transferred to the MN. When the T-SN Modification Required message is received, the MN transfers a T-SN modification request message to a T-SN of pre-configured candidate cells (operation 13-10). The T-SN modification request message may include information which is the same as the message of operation 10-30 of FIG.

10 (or at least one of pieces of information included in the message transmitted in operation 10-30). The T-SN having received the T-SN modification request message generates configuration information of a new candidate cell. The T-SN may generate or update configuration information of a new candidate cell by using a delta signal based on "configuration information of a source cell" received from the T-SN modification request message. In another embodiment, the T-SN may generate or update candidate cell configuration information by using a delta signal based on configuration information of an existing candidate cell rather than configuration information of a source cell. The updated configuration information of the candidate cell may be loaded in a T-SN modification request ack message and transferred to the MN again (operation 13-15). The T-SN modification request ack message corresponds to the message transmitted in operation 10-40 of FIG. 10. In operation 13-20, the MN transmits a T-SN modification response message to the S-SN. The T-SN modification response message may correspond to the message transmitted in operation 10-45 of FIG. 10. The S-SN having received the T-SN modification response message may transmit a T-SN modification response ack message to the MN. The T-SN modification response ack message may correspond to the message transmitted in operation 10-55 of FIG. 10.

The MN having received the T-SN modification response ack message may include updated T-SN candidate configuration information in an MN RRC reconfiguration message, and transfer same to a terminal (operation 13-30). The information may be included in the MN RRC reconfiguration message in a type of octet strings. When the terminal receives the information, performs a compliance check of the information, and a result of the check has no problem, the terminal may transfer an MN RRC reconfiguration complete message to the MN (operation 13-35). When the MN receives the MN RRC reconfiguration complete message, the MN may transfer a T-SN modification confirm message implying sCHO configuration completion to the S-SN.

Figure 14:
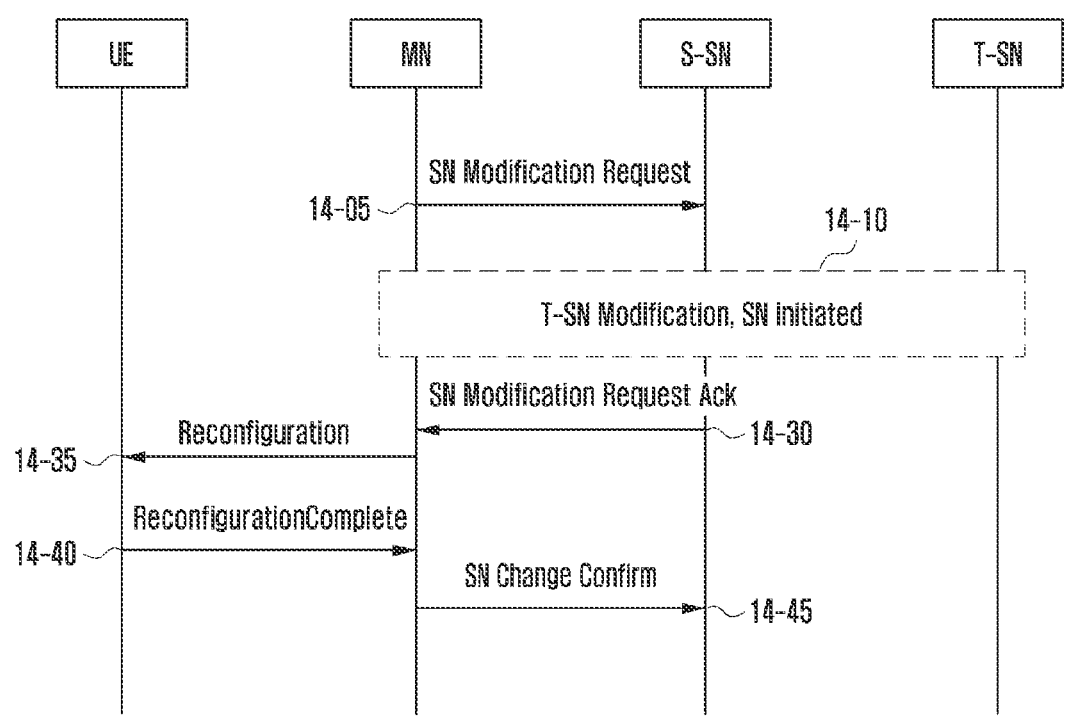
FIG. 14 is a diagram illustrating a procedure in which a change in an MN changes configurations of an S-SN and a T-SN according to an embodiment of the disclosure.

As another embodiment of the disclosure, FIG. 14 a diagram illustrating a case where a change in an MN changes configurations of an S-SN and a T-SN.

When a configuration of an MN is required to be changed (e.g., a case of security key update or MN security key change), the MN transfers an SN modification request message to an S-SN (operation 14-05). Information included in the message may be configuration information of the MN, and SCG configuration information required from the SN. For example, the SN modification request message may include pieces of information included in a current CG-Config and CG-ConfigInfo message. The S-SN may perform operation 14-10. The S-SN may transmit or receive, to or from a T-SN, the messages of operations 12-10 and 12-15 of the embodiment of FIG. 12 (a case where the T-SN modifies an SN RRC message made by the S-SN) or the messages of operations 13-10, 13-15, 13-20, and 13-25 of FIG. 13 (a case where the S-SN finally makes an SN RRC message by using configuration information made by the T-SN). When the S-SN has a final SN RRC reconfiguration message according to the procedure, the SN transfers an SN modification request ack message to the MN (operation 14-30). The MN transfers information received from the SN to a terminal (operation 14-35). The MN may transmit, to the terminal, a Reconfiguration message including the information received from the SN. The terminal updates existing pieces of configuration information by using the received message. Thereafter, the terminal transmits a Reconfiguration complete message to the MN (operation 14-40). The MN having received the Reconfiguration complete message transmits an SN change confirm message to the S-SN (operation 1445). Next, when a conditional mobility configuration includes a conditional PSCell change and a conditional handover used in a PSCell handover, operations of the terminal may be described as follows.

When a conditional mobility command or conditional mobility configuration information received by the terminal is used in a conditional PCell handover, the terminal may start this handover, and may transmit an RRCconnectionReconfigurationComplete or RRCReconfigurationComplete message to a target cell used in the PCell handover.

When conditional mobility configuration information received by the terminal is information used in a conditional PSCell change, the terminal may start this handover, and transmit an RRCconnectionReconfigurationComplete or RRCReconfigurationComplete message to a node having transmitted the received conditional mobility configuration information.

In the above examples, the conditional mobility command may indicate a CHO configuration information list. This CHO (or PSCell change/addition) configuration information list may have, as entries, ID values such as a CHO (or PSCell change/addition or conditional) reconfiguration ID, a CHO (or PSCell change/addition) candidate ID, or a CHO (or PSCell change/addition) candidate cell ID, and may associate, with an ID value of each entry, pair information of CHO (or PSCell change/addition) performing conditions and target cell configuration information to be used when CHO (or PSCell change/addition) is performed.

The performing condition may be referred to by a particular measurement ID among measurement configurations configured by the MN or SN. In addition, configuration information of a target candidate cell may be expressed by octet strings in the list.

As another embodiment, conditional HO or conditional SPcell change/addition may be indicated by an IE in which a one-bit conditional mobility command indication is included.

When a conditional mobility command is included in a container or an IE of MasterCellGroup, or exists as an uppermost level IE of RRCReconfiguration, this may indicate a conditional HO indication.

When a conditional mobility command is included in SCG-config, this may indicate a conditional PSCell change or addition.

In addition, in relation to distinguishment between general SN addition and conditional SN addition, In normal SN addition, a reconfiguration complete message is transmitted to the MN. However, in conditional SN addition, a reconfiguration complete message may be transmitted to the SN.

SN-initiated procedure

T-SNs transfers configuration information to the MN. The MN transfers the received configuration information to the S-SN without change. The S-SN collects configuration information made by T-SNs to make one message, and transfers the message to the MN, and the MN transfers the message to the terminal.

In a case where two types of CHOs, that is, a PCell CHO and an sCHO (conditional PSCell change/add) are configured together, when one CHO among two CHOs is performed, the terminal may stop performing of the other CHO.

<Second Disclosure>

The descriptions given with reference to FIG. 1, FIG. 2, FIG. 3, and FIG. 4 may be applied to or referred to for the second disclosure in the same way.

The following embodiments may correspond to both a case of EUTRA NR dual connectivity (ENDC) in which a core network is an evolved packet core (EPC) and a case of new radio dual connectivity (NRDC) in which a core network is a 5G core (5GC). Each of an MN and SNs may operate according to an RAT matching a DC type thereof, and accordingly, a terminal may also operate according to an RAT matching a DC type thereof. For example, in the following drawings, an MN RAT is represented by LTE, and an RRC message thereby is used for signaling. However, RRC messages corresponding to MN and SN RATs matching each DC type may be used. In addition, in a description given with an LTE or NR RAT in each embodiment, the LTE or NR RAT may be replaced with an MN or SN RAT for the DC type thereof.

According to an embodiment of the disclosure, in a conditional primary secondary cell (PSCell) change method of a terminal, the terminal may receive measurement configuration information from a secondary node connected to the terminal, and may perform measurement reporting, based on the measurement configuration information. The terminal may receive target cell configuration information and handover condition information from the secondary node, and determine whether a conditional handover condition is satisfied, based on the handover condition information. The terminal may perform a procedure of random access to a target cell, based on a result of the determination. When the random access procedure is successful, the terminal may transmit a message indicating handover completion to the target cell, and when the random access procedure fails, the terminal may transmit a message indicating handover failure to a master node connected to the terminal. This is an embodiment of the disclosure, and the above embodiment and other embodiments will be described in detail with reference to FIG. 15 to FIG. 18 below.

Figure 15:
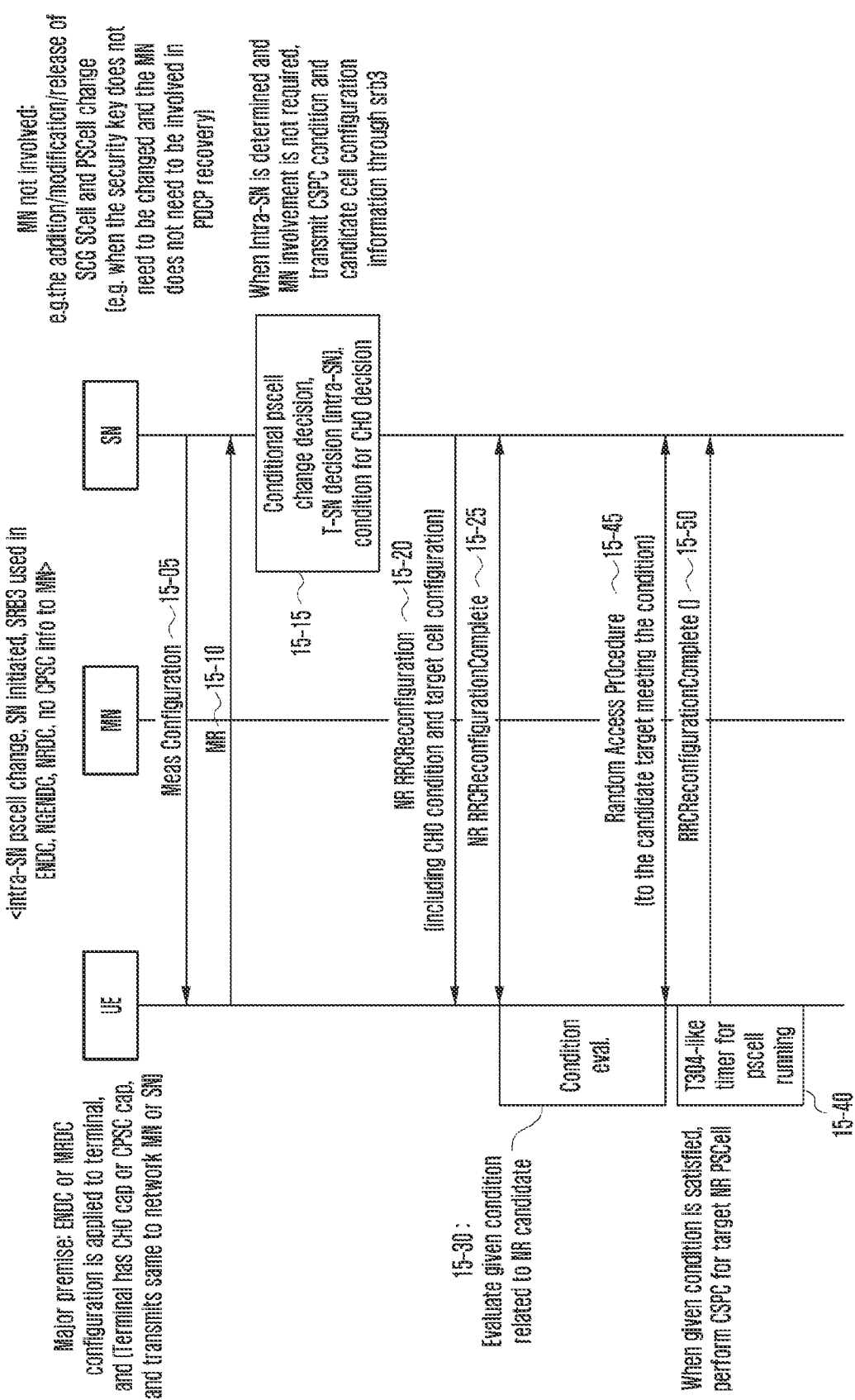
FIG. 15 is a flowchart of a case of performing a conditional PSCell change by using an SRB3 according to an embodiment of the disclosure.

FIG. 15 is a flowchart of a case of performing a conditional PSCell change by using a signaling radio bearer 3 (SRB3) according to an embodiment of the disclosure.

FIG. 15 is a flowchart showing a case where, when a terminal performs a conditional handover, a conditional PSCell change is configured for the terminal through an srb3 by an SN, and the terminal performs the conditional PSCell change.

A terminal is in dual connection with a master node (MN) and a secondary node (SN). The terminal may inform at least one of the MN and the SN that a conditional PSCell change is possible. That is, the terminal may provide at least one of the MN and the SN with information on capability, which indicates that the terminal supports a conditional PSCell change. The information on capability, which indicates that the terminal supports a conditional PSCell change, may include performance information related a conditional handover (CHO), and performance information related to a conditional PSCell change (CPSC). When it is identified that the terminal supports a PSCell change, the SN may transfer measurement configuration information (Meas Configuration) (operation 15-05).

When the terminal having received measurement information performs measurement reporting (MR) for the SN (operation 15-10), the SN determines to a conditional PSCell change, and selects, as a target, another cell in an SN secondary gNB (SgNB) previously received from the terminal (operation 15-15). In a case where the MN is not involved, when measurement information used as configuration information and a condition for a target or a target candidate cell is transferred to the terminal, measurement information used as configuration information and a condition for the corresponding cell may be included and transferred in an RRC reconfiguration message based on a radio access technology (RAT) of the SN, and the RRC reconfiguration message may be transferred through a signaling radio bearer (SRB3) (operation 15-20).

In addition, configuration information for a source cell may be included in the RRC reconfiguration message.

The terminal having received measurement information used as configuration information and a condition for the corresponding cell may perform a compliance check of condition information and configuration information to be used for the target or the target candidate cell. The terminal transfers an RRC reconfiguration complete message based on the SN RAT to the SN through an srb3 (operation 15-25). According to an embodiment of the disclosure, when only a condition of a conditional PSCell change or configuration information of the target or the target candidate cell exists in the RRC reconfiguration message based on the SN RAT without configuration information for a source cell, RRC reconfiguration complete may not be transmitted.

In addition, the terminal starts a measurement for the condition of the corresponding conditional PSCell change, and starts to determine whether the condition is satisfied (operation 15-30). The terminal performs a conditional handover to a target PSCell at the time point at which the condition is satisfied (operation 15-35). The terminal starts a timer by using T304-like information (or T304 information) transferred in a previous SN RRC reconfiguration for a conditional PSCell change (operation 15-40). The terminal performs a random access to the target PSCell (operation 15-45).

When the random access is successful, the terminal transmits an RRC reconfiguration complete message based on the SN RAT to the target PSCell (operation 15-50).

Figure 16A:
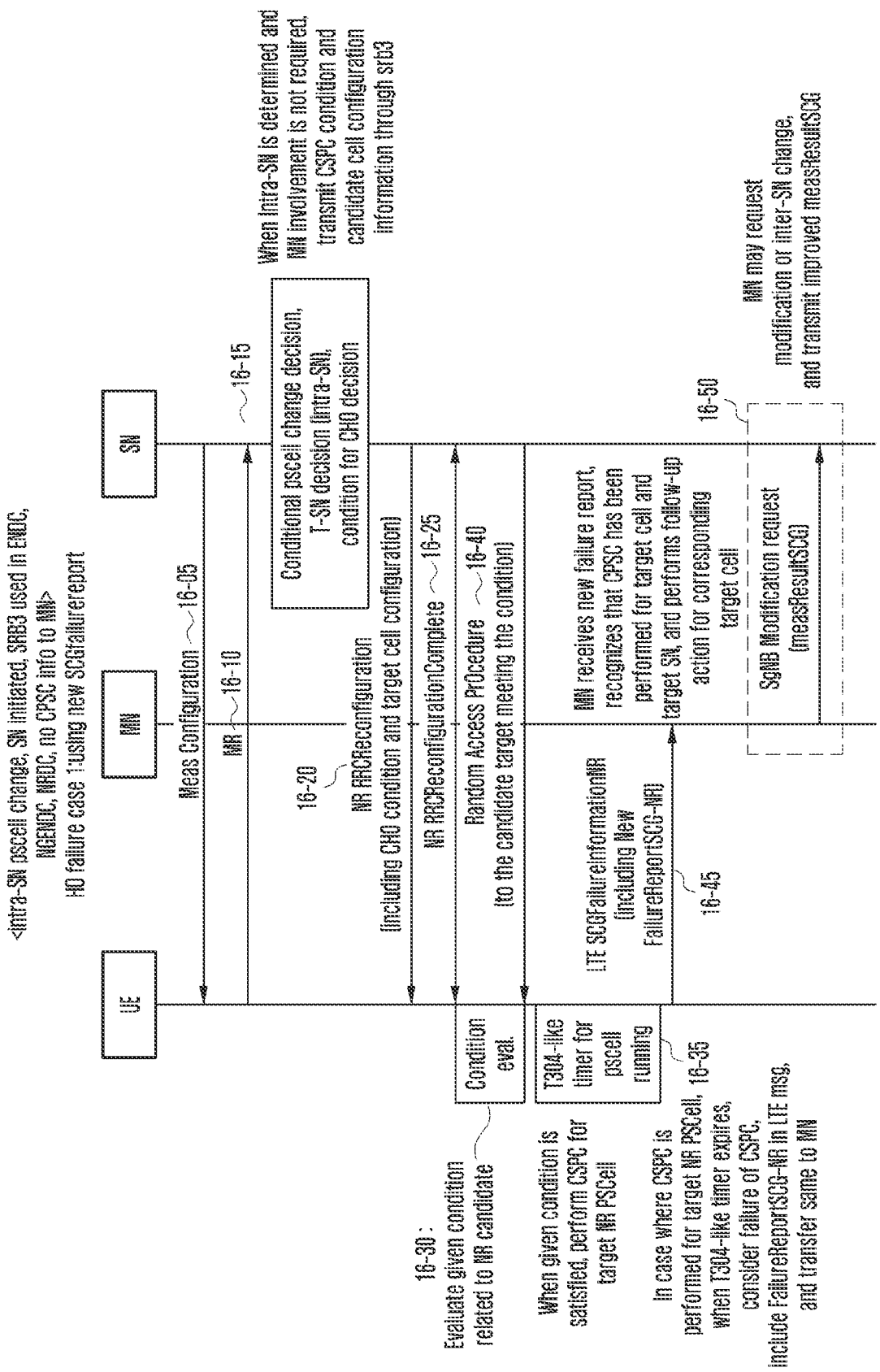

FIG. 16A and FIG. 16B are a flowchart of a case of transmitting a new failure report when a conditional PSCell change using an SRB3 fails according to an embodiment of the disclosure. Hereinafter, FIG. 16A and FIG. 16B are call FIG. 16.

FIG. 16 illustrates a solution of a case where the started conditional PSCell change fails. A terminal is in dual connection with a master node (MN) and a secondary node (SN). The terminal may inform at least one of the MN and the SN that a conditional PSCell change is possible. That is, the terminal may provide at least one of the MN and the SN with information on capability, which indicates that the terminal supports a conditional PSCell change. The information on capability, which indicates that the terminal supports a conditional PSCell change, may include performance information related a conditional handover (CHO), and performance information related to a conditional PSCell change (CPSC). When it is identified that the terminal supports a PSCell change, the SN may transfer measurement configuration information (Meas Configuration) (operation 16-05).

When the terminal having received measurement information performs measurement reporting (MR) for the SN (operation 16-10), the SN determines to a conditional PSCell change, and selects, as a target, another cell in an SN secondary gNB (SgNB) previously received from the terminal (operation 16-15). In a case where the MN is not related, when measurement information used as configuration information and a condition for a target or a target candidate cell is transferred to the terminal, measurement information used as configuration information and a condition for the corresponding cell may be included and transferred in an RRC reconfiguration message based on a radio access technology (RAT) of the SN, and the RRC reconfiguration message may be transferred through a signaling radio bearer (SRB3) (operation 16-20).

In addition, configuration information for a source cell may be included in the RRC reconfiguration message.

The terminal having received measurement information used as configuration information and a condition for the corresponding cell may perform a compliance check of condition information and configuration information to be used for the target or the target candidate cell. The terminal transfers an RRC reconfiguration complete message based on the SN RAT to the SN through an srb3 (operation 16-25). According to an embodiment of the disclosure, when only a condition of a conditional PSCell change or configuration information of the target or the target candidate cell exists in the RRC reconfiguration message based on the SN RAT without configuration information for a source cell, RRC reconfiguration complete may not be transmitted.

In addition, the terminal starts a measurement for the condition of the corresponding conditional PSCell change, and starts to determine whether the condition is satisfied (operation 16-30). The terminal performs a conditional handover to a target PSCell at the time point at which the condition is satisfied. The terminal starts a timer by using T304-like information (or T304 information) transferred in a previous SN RRC reconfiguration in order to perform a conditional PSCell change (operation 16-35). The terminal performs a random access to the target PSCell (operation 1640).

When the random access fails to succeed until the T304-like timer expires, or when the conditional PSCell change is not successfully complete, the terminal may determine (or identify) that the conditional handover fails. When it is determined that the conditional handover fails, the terminal may include the following pieces of information in an SCGFailureInformationNR message based on an MN RAT, and transmit same to the MN (operation 1645). The disclosure is not limited to the above example, and the SCGFailureInformationNR may include all or at least one of the following pieces of information.

Failure type information indicating one of t310-Expiry, randomAccessProblem (random access failure), rlc-MaxNumRetx (RLC maximum transmission), synchReconfigFailure-SCG (T304 timer expiry), scg-reconfigFailure (failure of reconfiguration of scg), and srb3-IntegrityFailure (failure of integrity in srb3). This information may be included in an LTE message.

Measurement information configured by MN for SN, that is, NR frequency (result of measurement of serving cell and neighboring cell). This information may be included in an MN RRC part.

Measurement information configured by SN for frequency of NR (result of measurement of serving cell and neighboring cell). This information may be included in an SN NR RRC container part.

One-bit indicator indicating, as failure type, failure of conditional PSCell change. This information may be included in an MN RRC part and an SN NR RRC part.

Available conditional PSCell change candidate cell configuration information (a PCI, a CGI, and a candidate ID of a candidate cell). This information may be included in an MN RRC part and an SN NR RRC part.

Information on cell failing in the attempted conditional PSCell change (a PCI, a CGI, a candidate ID, and a node ID as failed conditional PSCell information). This information may be included in an MN RRC part and an SN NR RRC part.

At least one information among the pieces of information described above may be included in an SCGFailureInformationNR message as information on failure of a general handover or a conditional handover according to a PSCell change or a conditional PSCell change, and may then be transmitted to the MN (operation 16-45).

The MN having received the at least one information described above through the SCGFailureInformationNR message may recognize, through a failed cell and SN information of a failure report (a failure report like the SCGFailureInformationNR message), that a conditional PSCell change has been performed, and has failed, and may perform a follow-up action for the corresponding target cell (operation 16-50).

According to an embodiment, as the follow-up action for failure of the PSCell change, the MN may transmit an SN modification request to a source SN, or may request an inter-SN change from anew SN (operation 16-50). According to an embodiment, the MN may include at least one of pieces of information (e.g., information included in an NR part of the failure report) included in the failure report in an SN modification request message or SN addition request message, and transmit same.

That is, the SN modification request message or SN addition request message may include at least one of pieces of information included in an NR part of the failure report. Accordingly, a network may avoid a target cell that has failed once and select another alternative cell or alternative SN.

When the change is successful, the terminal transmits an RRC reconfiguration complete message based on the SN RAT to the target cell.

Figure 17:
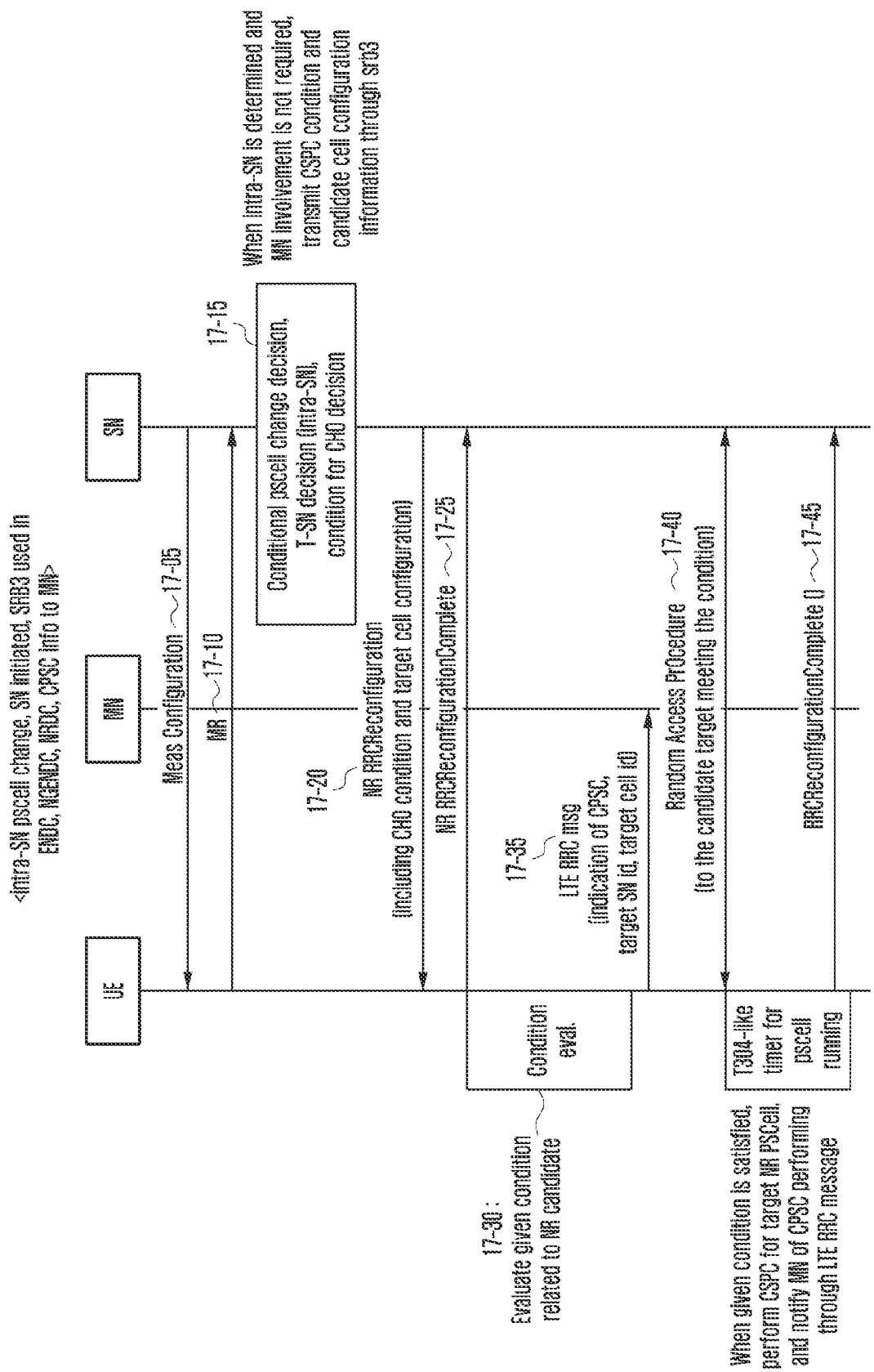
FIG. 17 is a flowchart of a case of, when performing a conditional PSCell change by using an SRB3, notifying an MN of the performing through an MN RRC message according to an embodiment of the disclosure.

FIG. 17A and FIG. 17B is a flowchart of a case of, when performing a conditional PSCell change by using an SRB3, notifying an MN of the performing through an MN RRC message according to an embodiment of the disclosure. Hereinafter, FIG. 17A and FIG. 17B are call FIG. 17.

FIG. 17 is a flowchart of a case of, at a time point at which a conditional PSCell change is performed, notifying, through an RRC message based on an MN RAT, an MN that the condition PSCell change is performed.

A terminal is in dual connection with a master node (MN) and a secondary node (SN). The terminal may inform at least one of the MN and the SN that a conditional PSCell change is possible. That is, the terminal may provide at least one of the MN and the SN with information on capability, which indicates that the terminal supports a conditional PSCell change. The information on capability, which indicates that the terminal supports a conditional PSCell change, may include performance information related a conditional handover (CHO), and performance information related to a conditional PSCell change (CPSC). When it is identified that the terminal supports a PSCell change, the SN may transfer measurement configuration information (Meas Configuration) (operation 17-05).

When the terminal having received measurement information performs measurement reporting (MR) for the SN (operation 17-10), the SN determines to a conditional PSCell change, and selects, as a target, another cell in an SN secondary gNB (SgNB) previously received from the terminal (operation 17-15). In a case where the MN is not involved, when measurement information used as configuration information and a condition for a target or a target candidate cell is transferred to the terminal (operation 17-20), measurement information used as configuration information and a condition for the corresponding cell may be included and transferred in an RRC reconfiguration message based on a radio access technology (RAT) of the SN, and the RRC reconfiguration message may be transferred through a signaling radio bearer (SRB3).

In addition, configuration information for a source cell may be included in the RRC reconfiguration message.

The terminal having received measurement information used as configuration information and a condition for the corresponding cell may perform a compliance check of condition information and configuration information to be used for the target or the target candidate cell. The terminal transfers an RRC reconfiguration complete message based on the SN RAT to the SN through an srb3 (operation 17-25). According to an embodiment of the disclosure, when only a condition of a conditional PSCell change or configuration information of the target or the target candidate cell exists in the RRC reconfiguration message based on the SN RAT without configuration information for a source cell, RRC reconfiguration complete may not be transmitted.

In addition, the terminal starts a measurement for the condition of the corresponding conditional PSCell change, and starts to determine whether the condition is satisfied (operation 17-30). At the time point at which the condition is satisfied, the terminal may perform the following operations.

- The terminal performs a conditional handover to a target PSCell.
- The terminal starts a timer by using T304-like information (or T304 information) transferred in a previous SN RRC reconfiguration for a conditional PSCell change.
- The terminal performs a random access to the target PSCell (operation 1740).
- The terminal transmits an RRC message (e.g., LTE RRC msg of FIG. 9) based on an MN RAT to the MN (operation 17-35). The RRC message based on the MN RAT may include at least one of an indicator indicating that a conditional PSCell has been performed, node information (node ID or SN ID) of an SN for which the conditional PSCell has been performed, and cell information (candidate ID, PCI, or CGI) of a target cell for which the conditional PSCell has been performed.

When a random access performed by the terminal for a conditional PSCell change is successful, the terminal transmits an RRC reconfiguration complete message based on the SN RAT to a corresponding target PSCell (operation 1745).

Figure 18A:
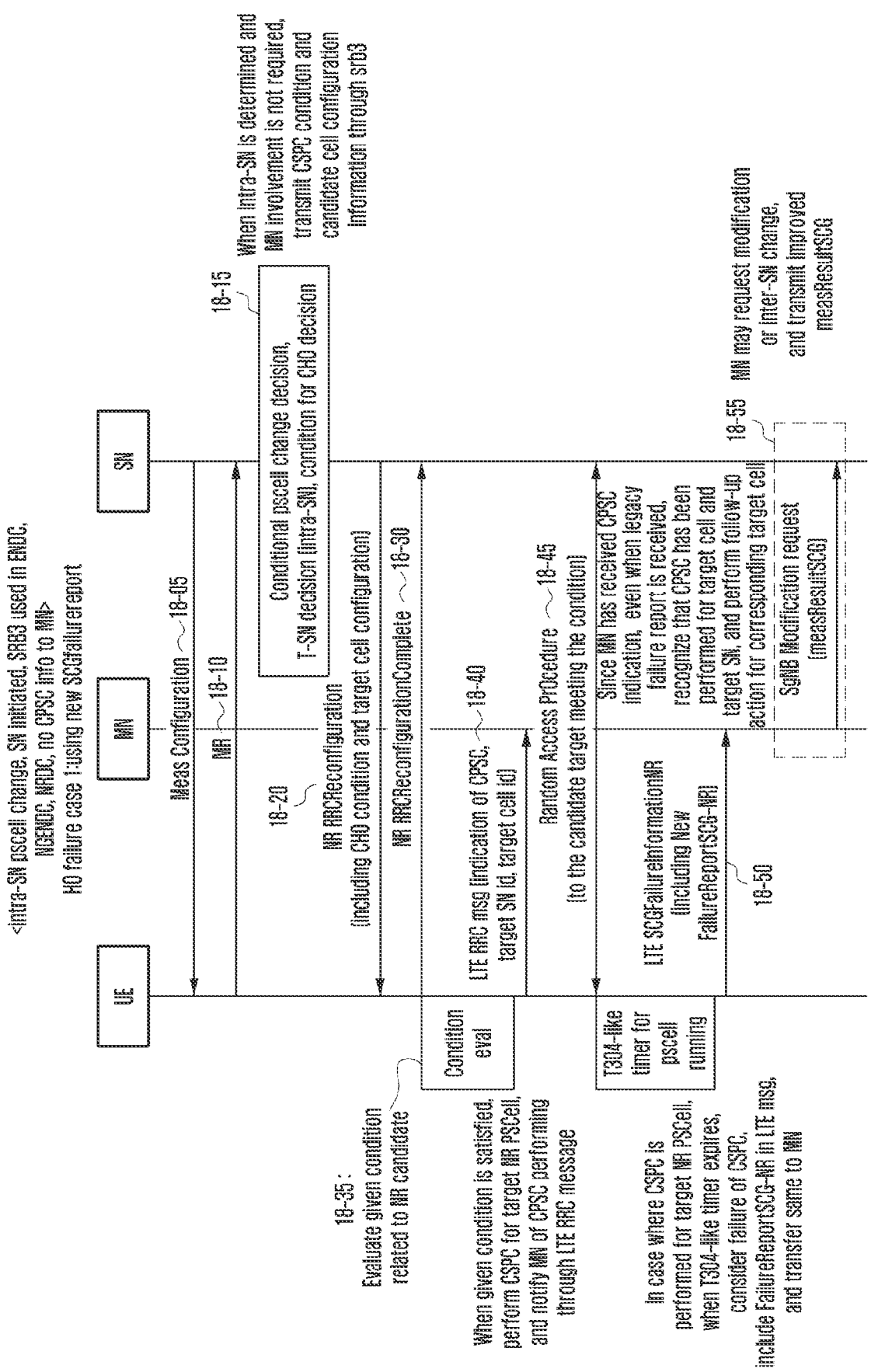

FIG. 18 is a flowchart of a case of, when performing a conditional PSCell change by using an SRB3, and notifying an MN of the performing through an MN RRC message, processing PSCell change failure according to an embodiment of the disclosure.

Referring to FIG. 18, FIG. 18 illustrates a flowchart of a method of, in a case where a conditional PSCell change is performed for an MN through an RRC message based on an MN RAT at a time point at which the conditional PSCell change is performed, when failure of the PSCell change occurs, processing the failure.

A terminal is in dual connection with a master node (MN) and a secondary node (SN). The terminal may inform at least one of the MN and the SN that a conditional PSCell change is possible. That is, the terminal may provide at least one of the MN and the SN with information on capability, which indicates that the terminal supports a conditional PSCell change. The information on capability, which indicates that the terminal supports a conditional PSCell change, may include performance information related a conditional handover (CHO), and performance information related to a conditional PSCell change (CPSC).

When it is identified that the terminal supports a PSCell change, the SN may transfer measurement configuration information (Meas Configuration) (operation 18-05).

When the terminal having received measurement information performs measurement reporting (MR) for the SN (operation 18-10), the SN determines to a conditional PSCell change, and selects, as a target, another cell in an SN secondary gNB (SgNB) previously received from the terminal (operation 18-15). In a case where the MN is not involved, when measurement information used as configuration information and a condition for a target or a target candidate cell is transferred to the terminal, measurement information used as configuration information and a condition for the corresponding cell may be included and transferred in an RRC reconfiguration message based on a radio access technology (RAT) of the SN, and the RRC reconfiguration message may be transferred through a signaling radio bearer (SRB3)(operation 18-20).

In addition, configuration information for a source cell may be included in the RRC reconfiguration message.

The terminal having received measurement information used as configuration information and a condition for the corresponding cell may perform a compliance check of condition information and configuration information to be used for the target or the target candidate cell. The terminal transfers an RRC reconfiguration complete message based on the SN RAT to the SN through an srb3 (operation 18-30). According to an embodiment of the disclosure, when only a condition of a conditional PSCell change or configuration information of the target or the target candidate cell exists in the RRC reconfiguration message based on the SN RAT without configuration information for a source cell, RRC reconfiguration complete may not be transmitted.

In addition, the terminal starts a measurement for the condition of the corresponding conditional PSCell change, and starts to determine whether the condition is satisfied (operation 18-35). At the time point at which the condition is satisfied, the terminal may perform the following operations.

- The terminal performs a conditional handover to a target PSCell.
- The terminal starts a timer by using T304-like information (or T304 information) transferred in a previous SN RRC reconfiguration for a conditional PSCell change.
- The terminal performs a random access to the target PSCell (operation 18-45).
- The terminal transmits an RRC message (e.g., LTE RRC msg of FIG. 10) based on an MN RAT to the MN. The RRC message based on the MN RAT may include at least one of an indicator indicating that a conditional PSCell has been performed, node information (node ID or SN ID) of an SN for which the conditional PSCell has been performed, and cell information (candidate ID, PCI, or CGI) of a target cell for which the conditional PSCell has been performed (operation 1840).

When a random access performed by the terminal for a conditional PSCell change is successful, the terminal transmits an RRC reconfiguration complete message based on the SN RAT to a corresponding target cell.

When the random access fails to succeed until the T304-like timer expires, or when the conditional PSCell change is not successfully complete, the terminal may determine (or identify) that the conditional handover (PSCell change)

fails. When it is determined that the conditional handover fails, the terminal may include the following pieces of information in an SCGFailureInformationNR message based on an MN RAT, and transmit same to the MN (operation 18-50). The disclosure is not limited to the above example, and the SCGFailureInformationNR may include all or at least one of the following pieces of information.

- Failure type information indicating one of t310-Expiry, randomAccessProblem (random access failure), rlcMaxNumRetx (RLC maximum transmission), synchReconfigFailure-SCG (T304 timer expiry), scg-reconfigFailure (failure of reconfiguration of scg), and srb3-IntegrityFailure (failure of integrity in srb3). This information may be included in an LTE message.
- Measurement information configured by MN for SN, that is. NR frequency (result of measurement of serving cell and neighboring cell). This information may be included in an MN RRC part.
- Measurement information configured by SN for frequency of NR (result of measurement of serving cell and neighboring cell). This information may be included in an SN NR RRC container part.

At least one information among the pieces of information described above may be included in an SCGFAilureInformationNR message as information on failure of a general handover or a conditional handover according to a PSCell change or a conditional PSCell change, and may then be transmitted to the MN (operation 18-50).

The MN having received the at least one information described above through the SCGFAilureInformationNR message may recognize, from conditional PSCell change attempt information transmitted through a previous RRC message based on the MN RAT, that a failed operation is a conditional PSCell change, and may perform, based on information on a target cell and target SN subjected to the attempt, a follow-up action for the corresponding target cell (operation 18-55).

According to an embodiment, as the follow-up action for failure of the PSCell change, the MN may transmit an SN modification request to a source SN, or may request an inter-SN change from a new SN. According to an embodiment, the MN may include at least one of pieces of information (e.g., information included in an NR part of the failure report) included in the failure report (or MN RAT-based RRC message that has been transmitted when a conditional PSCell change is performed) in an SN modification request message or SN addition request message, and transmit same (operation 18-55).

That is, the SN modification request message or SN addition request message may include at least one of information included in the failure report, or RRC messages based on the MN RAT. Accordingly, a network may avoid a target cell that has failed once and select another alternative cell or alternative SN.

When the change is successful, the terminal transmits an RRC reconfiguration complete message based on the SN RAT to the target cell.

Furthermore, according to an embodiment of the disclosure, the terminal may add, to the report, information relating to whether the failure is failure in an inter-MN CPSC or intra-SN CPSC with respect to the terminal, and transmit same to the network. In a case of a PSCell change in which the MN is involved, the terminal may receive CPSC configuration information through a signal of the MN. The signal indicates signaling to an SRB terminated in the MN.

For example, SRB0, 1, and 2 and split SRB 0, 1, and 2 may be possible. Alternatively, when the MN is not involved, the terminal may transmit or receive a signal (or information) related to the CPSC by using signaling (e.g., SN terminated SRBs like SRB3s) of the SN rather than signaling of the MN in the above embodiment.

In addition, according to an embodiment of the disclosure, when the terminal fails a CPSC while performing the CPSC through a signal of the MN or SN, the terminal may transfer SCG failure information through an RRC message corresponding to the MN RAT. The terminal may include information indicating whether the failure is failure related to CPSC configuration information received by the MN, or failure related to CPSC configuration information received by the SN. Specifically, the terminal may report synchReconfigFailureSCG in failureType-r15, and report, through a new ID, whether the failure is conditional handover failure or CPSC failure. In addition, the terminal may perform reporting including an indication indicating that failure is CPSC failure of an SN signal. Information indicating that failure is CPSC failure, and an indication that failure is CPSC failure by an SN signal may be included in an RRC container part of the SN and an MN RRC part of an RRC message of the MN.

According to an embodiment of the disclosure, other than an example of including and transmitting, to the MN, an indication factor indicating whether the failure is failure related to CPSC configuration information received through an MN RRC SCGFailureInformation message, or failure related to CPSC configuration information received by the SN, when the failure is failure related to CPSC configuration information received by the MN, an MN RRC based failure message may be generated and transmitted to the MN, and when the failure is CPSC failure related to CPSC configuration information received by the SN, an SN RRC based failure message may be generated and transmitted to the SN. The MN RRC based failure message may also include an indicator indicating CPSC failure, as a failure type. In addition, when the failure is failure by a signal of the SN, the SN RRC based failure message may also include an indicator indicating CPSC failure, as a failure type.

Figure 19:
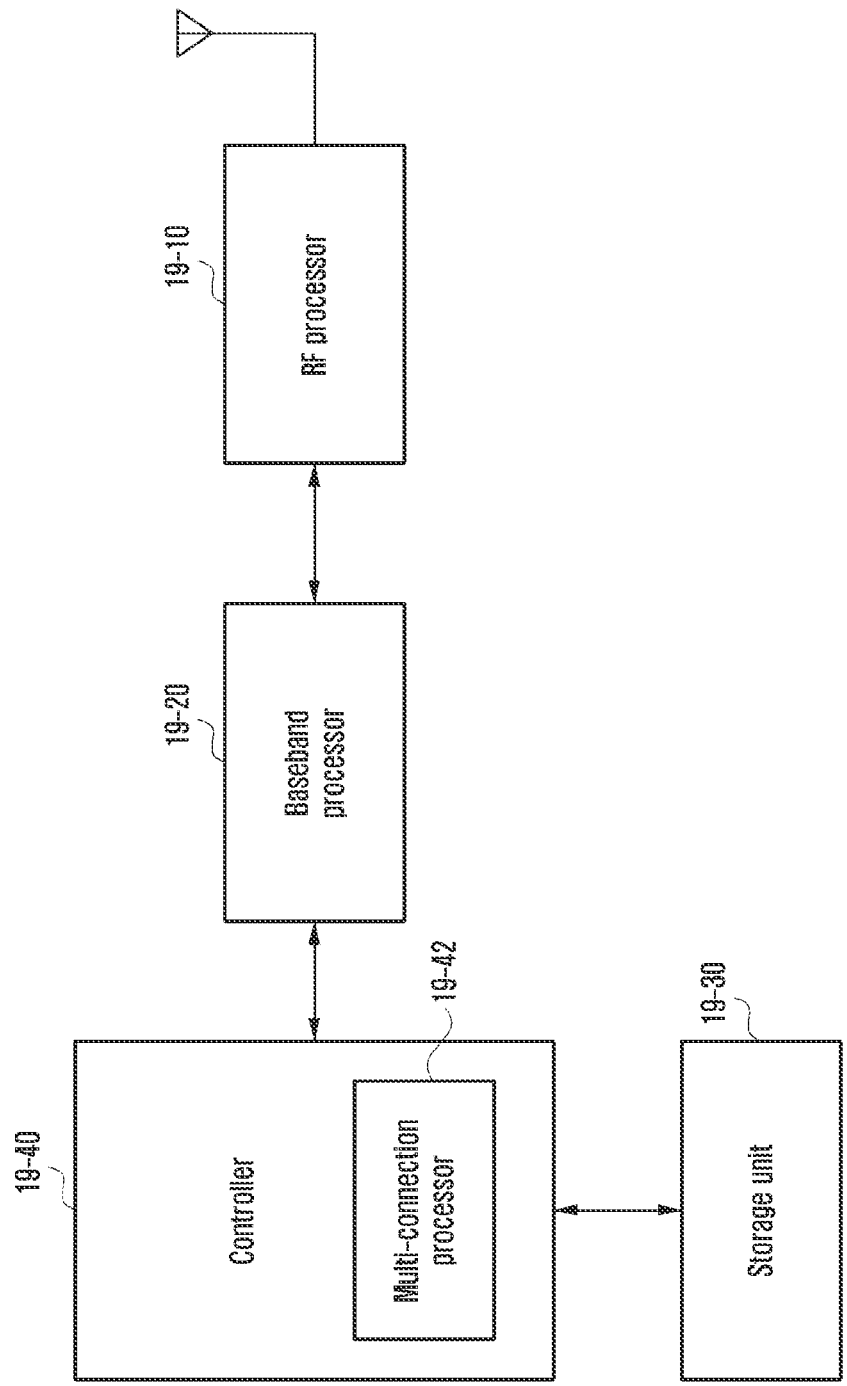
FIG. 19 is a block diagram illustrating an internal structure of a terminal according to an embodiment of the disclosure.

FIG. 19 is a block diagram illustrating an internal structure of a terminal employing the disclosure.

Referring to FIG. 19, the terminal may include a radio frequency (RF) processor 19-10, a baseband processor 19-20, a storage unit 19-30, and a controller 19-40. However, the disclosure is not limited to the example, and the terminal may include a smaller or larger number of elements, compared to the elements illustrated in FIG. 19.

The RF processor 19-10 may perform a function, such as signal band change, amplification, etc., for transmitting or receiving a signal through a wireless channel. That is, the RF processor 19-10 may upconvert a baseband signal provided from the baseband processor 19-20, into an RF band signal, and then transmit the RF band signal through an antenna, and downconvert an RF band signal received through the antenna, into a baseband signal. For example, the RF processor 19-10 may include a transmission filter, a reception filter, an amplifier, a mixer, an oscillator, a digital-to-analog converter (DAC), an analog-to-digital converter (ADC), and the like. The disclosure is not limited to the example. In FIG. 19, only one antenna is illustrated, but the terminal may include a plurality of antennas. In addition, the RF processor 19-10 may include a plurality of RF chains. Moreover, the RF processor 19-10 may perform beamforming. To perform beamforming, the RF processor 19-10 may adjust the phase and size of each of signals transmitted or received through a plurality of antennas or antenna elements. In addition, the RF processor 19-10 may perform multi-input multi-output (MIMO), and may receive several layers at the time of performing an MIMO operation.

The baseband processor 19-20 performs a function of conversion between a baseband signal and a bitstream according to a physical layer protocol of a system. For example, when data is transmitted, the baseband processor 19-20 generates complex symbols by encoding and modulating a transmission bitstream. In addition, when data is received, the baseband processor 19-20 may reconstruct a reception bit stream by demodulating and decoding a baseband signal provided from the RF processor 19-10. For example, in a case where an orthogonal frequency division multiplexing (OFDM) scheme is applied, when data is transmitted, the baseband processor 19-20 generates complex symbols by encoding and modulating a transmission bitstream, maps the complex symbols to subcarriers, and then configures OFDM symbols through inverse fast Fourier transform (IFFT) calculation and cyclic prefix (CP) insertion. In addition, when data is received, the baseband processor 19-20 may divide a baseband signal provided from the RF processor 19-10, by the units of OFDM symbols, reconstruct signals mapped to subcarriers, through fast Fourier transform (FFT), and then reconstruct a reception bit stream through demodulation and decoding.

The baseband processor 19-20 and the RF processor 19-10 transmits and receives a signal as described above. The baseband processor 19-20 and the RF processor 19-10 may be called a transmitter, a receiver, a transceiver, or a communication unit. Furthermore, at least one of the baseband processor 19-20 and the RF processor 19-10 may include a plurality of communication modules to support a plurality of different wireless access technologies. In addition, at least one of the baseband processor 19-20 and the RF processor 19-10 may include different communication modules to process signals in different frequency bands. For example, different wireless access technologies may include wireless LAN (e.g., IEEE 802.11), cellular network (e.g., LTE), etc. Furthermore, different frequency bands may include a super high frequency (SHF) (e.g., 2.NRHz and NGHz) band, a millimeter (mm) wave (e.g., 60 GHz) band, etc. The terminal may exchange a signal with a base station by using the baseband processor 19-20 and the RF processor 19-10, and the signal may include control information and data.

The storage unit 19-30 stores data such as a basic program, an application program, and configuration information for an operation of the terminal. Particularly, the storage unit 19-30 may store information related to a second access node that performs wireless communication by using a second wireless access technology. The storage unit 19-30 provides stored data in response to a request of the controller 19-40. The storage unit 19-30 may be configured by a storage medium such as ROM, RAM, hard disk, CD-ROM, and DVD, or a combination of storage mediums. In addition, the storage unit 19-30 may be configured by a plurality of memories.

The controller 19-40 controls overall operations of the terminal. For example, the controller 19-40 transmits or receives a signal via the baseband processor 19-20 and the RF processor 19-10. In addition, the controller 19-40 records and reads data in and from the storage unit 19-30. To this end, the controller 19-40 may include at least one processor. For example, the controller 19-40 may include a communication processor (CP) performing a control for communication, and an application processor (AP) controlling a higher layer, such as an application program. In addition, at least one element in the terminal may be implemented as a single chip.

According to an embodiment of the disclosure, the controller 19-40 may control each element of the terminal in order to perform a handover method according to an embodiment of the disclosure. Regarding the handover method of the disclosure, the embodiments described with reference to FIG. 15 to FIG. 18 are referred to.

Figure 20:
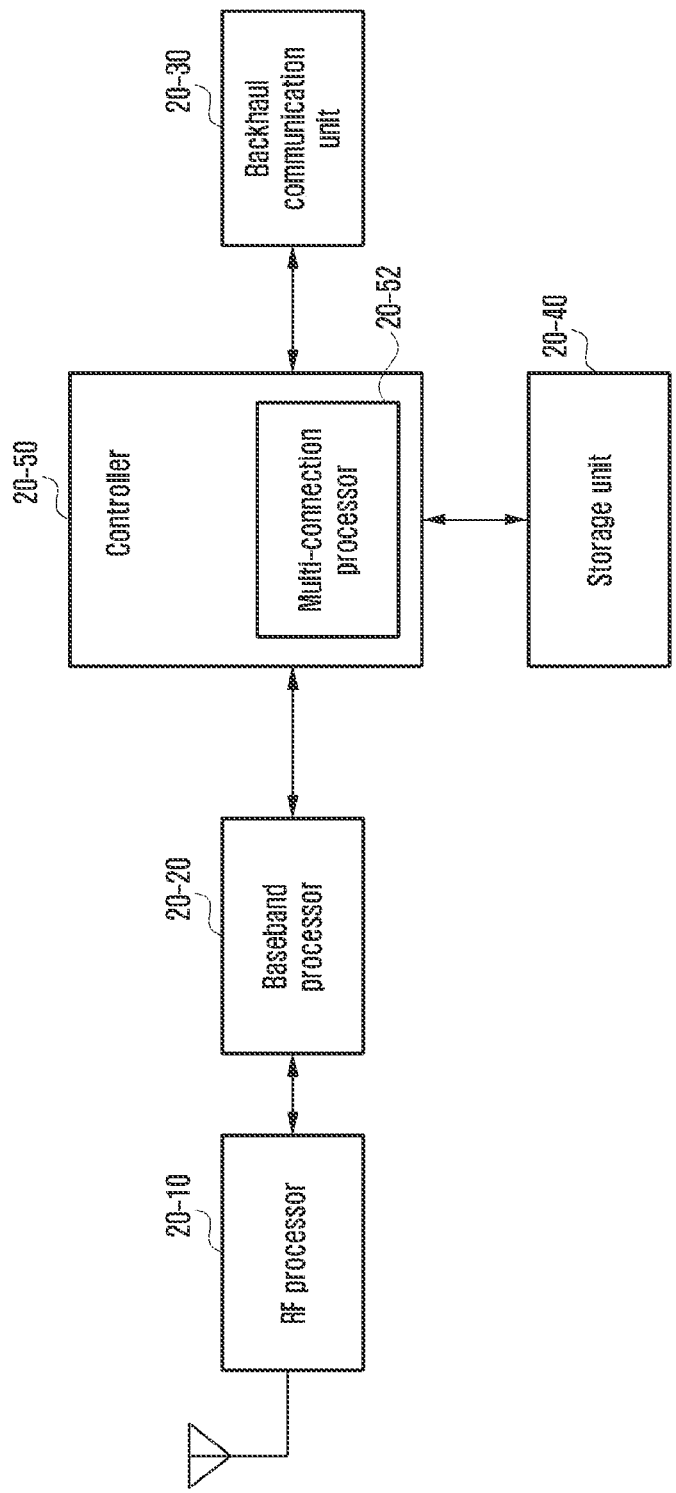
FIG. 20 is a block diagram illustrating a configuration of an NR base station according to an embodiment of the disclosure.

FIG. 20 is a block diagram illustrating a configuration of an NR base station according to an embodiment of the disclosure.

Referring to FIG. 20, the base station may include an RF processor 20-10, a baseband processor 20-20, a backhaul communication unit 20-30, a storage unit 20-40, and a controller 20-50. However, the disclosure is not limited to the example, and the base station may include a smaller or larger number of elements, compared to the elements illustrated in FIG. 20.

The RF processor 20-10 may perform a function, such as signal band change, amplification, etc., for transmitting or receiving a signal through a wireless channel. That is, the RF processor 20-10 upconverts a baseband signal provided from the baseband processor 20-20, into an RF band signal, and then transmits the RF band signal through an antenna, and downconverts an RF band signal received through the antenna, into a baseband signal. For example, the RF processor 20-10 may include a transmission filter, a reception filter, an amplifier, a mixer, an oscillator, a digital-to-analog converter (DAC), an analog-to-digital converter (ADC), and the like. In FIG. 20, only one antenna is illustrated, but the RF processor 20-10 may include a plurality of antennas. Furthermore, the RF processor 20-10 may include a plurality of RF chains. Moreover, the RF processor 20-10 may perform beamforming. To perform beamforming, the RF processor 20-10 may adjust the phase and size of each of signals transmitted or received through a plurality of antennas or antenna elements. The RF processor 20-10 may perform a downlink MIMO operation by transmitting at least one layer.

The baseband processor 20-20 performs a function of conversion between a baseband signal and a bit stream according to a physical layer protocol of a wireless access technology. For example, when data is transmitted, the baseband processor 20-20 may generate complex symbols by encoding and modulating a transmission bitstream. In addition, when data is received, the baseband processor 20-20 reconstructs a reception bit stream by demodulating and decoding a baseband signal provided from the RF processor 20-10. For example, in a case where an OFDM scheme is applied, when data is transmitted, the baseband processor 20-20 generates complex symbols by encoding and modulating a transmission bitstream, maps the complex symbols to subcarriers, and then configures OFDM symbols through IFFT calculation and CP insertion. In addition, when data is received, the baseband processor 20-20 may divide a baseband signal provided from the RF processor 20-10, by the units of OFDM symbols, reconstruct signals mapped to subcarriers, through FFT, and then reconstruct a reception bit stream through demodulation and decoding. The baseband processor 20-20 and the RF processor 20-10 may transmit and receive a signal as described above. Accordingly, the baseband processor 20-20 and the RF processor 20-10 may be called a transmitter, a receiver, a transceiver, a communication unit, or a wireless communication unit. The base station may exchange a signal with a terminal by using the baseband processor 20-20 and the RF processor 20-10, and the signal may include control information and data.

The backhaul communication unit 20-30 provides an interface for performing communication with other nodes within a network. That is, the backhaul communication unit 20-30 may convert, into a physical signal, a bit stream transmitted from a main base station to another node, for example, an auxiliary base station, a core network, etc., and may convert a physical signal received from another node, into a bit stream. The backhaul communication unit 20-30 may be included in a communication unit.

The storage unit 20-40 stores data such as a basic program, an application program, and configuration information for an operation of the base station. Particularly, the storage unit 20-40 may store information on a bearer assigned to a connected terminal, a measurement result reported from a connected terminal, etc. In addition, the storage unit 20-40 may store information serving as a determination criterion of whether to provide or stop providing multi-connection to a terminal. The storage unit 20-40 provides stored data in response to a request of the controller 20-50. The storage unit 20-40 may be configured by a storage medium such as ROM, RAM, hard disk, CD-ROM, and DVD, or a combination of storage mediums. In addition, the storage unit 20-40 may be configured by a plurality of memories.

The controller 20-50 controls overall operations of the base station. For example, the controller 20-50 transmits or receives a signal via the baseband processor 20-20 and the RF processor 20-10, or via the backhaul communication unit 20-30. In addition, the controller 20-50 records and reads data in and from the storage unit 20-40. To this end, the controller 20-50 may include at least one processor. In addition, at least one element in the base station may be implemented as a single chip.

According to an embodiment of the disclosure, the controller 20-50 may control each element of the base station in order to perform a handover method according to an embodiment of the disclosure. Regarding the handover method of the disclosure, the embodiments described with reference to FIG. 15 to FIG. 18 are referred to.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, a part of one embodiment of the disclosure may be combined with a part of any other embodiment to operate a base station and a terminal. In addition, the embodiments of the disclosure may be applied to other communication systems and other variants based on the technical idea of the embodiments may also be implemented.

The invention claimed is:

1. A method performed by a terminal in a wireless communication system, the method comprising:
- transmitting a capability information including information indicating whether the terminal supports conditional primary secondary cell (PSCell) change;
- receiving a radio resource control (RRC) reconfiguration message including condition information for the conditional PSCell change for a secondary node (SN);
- transmitting an RRC reconfiguration complete message as a response to the RRC reconfiguration message;
- performing actions related to the conditional PSCell change based on the condition information for the conditional PSCell change; and
- transmitting a secondary cell group (SCG) failure information including an identity of a PSCell associated with a failure of the conditional PSCell change, in case that the failure of the conditional PSCell change is identified.

2. The method of claim 1,
- wherein the SCG failure information further includes a failure type, and
- wherein the failure type includes one of a failure associated with random access or a failure associated with the conditional PSCell change.

3. The method of claim 1,
- wherein the capability information further includes performance information related to the conditional PSCell change, and
- wherein the identity of the PSCell corresponds to a physical cell identity of the PSCell.

4. The method of claim 1,
wherein a timer associated with the conditional PSCell change is started based on the RRC reconfiguration message, and
wherein the failure of the conditional PSCell change is identified in case that a random access for the conditional PSCell change is not completed until the timer expires.

5. The method of claim 1,
wherein the RRC reconfiguration message is received through a signaling radio bearer 3 (SRB 3), and
wherein the RRC reconfiguration complete message is transmitted through the SRB 3.

6. A method performed by a base station of a secondary node (SN) in a wireless communication system, the method comprising:
obtaining a capability information including information indicating whether the terminal supports conditional primary secondary cell (PSCell) change;
transmitting a radio resource control (RRC) reconfiguration message including condition information for the conditional PSCell change for the SN;
receiving an RRC reconfiguration complete message as a response to the RRC reconfiguration message; and
receiving a secondary cell group (SCG) failure information including an identity of a PSCell associated with a failure of the conditional PSCell change, in case that the failure of the conditional PSCell change is identified,
wherein actions related to the conditional PSCell change are performed based on the condition information for the conditional PSCell change.

7. The method of claim 6,
wherein the SCG failure information further includes a failure type, and
wherein the failure type includes one of a failure associated with random access or a failure associated with the conditional PSCell change.

8. The method of claim 6,
wherein the capability information further includes performance information related to the conditional PSCell change, and
wherein the identity of the PSCell corresponds to a physical cell identity of the PSCell.

9. The method of claim 6,
wherein a timer associated with the conditional PSCell change is started based on the RRC reconfiguration message, and
wherein the failure of the conditional PSCell change is identified in case that a random access for the conditional PSCell change is not completed until the timer expires.

10. The method of claim 6,
wherein the RRC reconfiguration message is transmitted through a signaling radio bearer 3 (SRB 3), and
wherein the RRC reconfiguration complete message is received through the SRB 3.

11. A terminal in a wireless communication system, the terminal comprising:
a transceiver; and
a controller configured to:
transmit, via the transceiver, a capability information including information indicating whether the terminal support conditional primary secondary cell (PSCell) change,
receive, via the transceiver, a radio resource control (RRC) reconfiguration message including condition information for the conditional PSCell change for a secondary node (SN),
transmit, via the transceiver, an RRC reconfiguration complete message as a response to the RRC reconfiguration message,
perform actions related to the conditional PSCell change based on the condition information for the conditional PSCell change, and
transmit, via the transceiver, a secondary cell group (SCG) failure information including an identity of a PSCell associated with a failure of the conditional PSCell change, in case that the failure of the conditional PSCell change is identified.

12. The terminal of claim 11,
wherein the SCG failure information further includes a failure type, and
wherein the failure type includes one of a failure associated with random access or a failure associated with the conditional PSCell change.

13. The terminal of claim 11, wherein the capability information further includes performance information related to the conditional PSCell change, and
wherein the identity of the PSCell corresponds to a physical cell identity of the PSCell.

14. The terminal of claim 11,
wherein a timer associated with the conditional PSCell change is started based on the RRC reconfiguration message, and
wherein the failure of the conditional PSCell change is identified in case that a random access for the conditional PSCell change is not completed until the timer expires.

15. The terminal of claim 11,
wherein the RRC reconfiguration message is received through a signaling radio bearer 3 (SRB 3), and
wherein the RRC reconfiguration complete message is transmitted through the SRB 3.

16. A base station of a secondary node (SN) in a wireless communication system, the base station comprising:
a transceiver; and
a controller configured to:
obtain a capability information including information indicating whether the terminal support conditional primary secondary cell (PSCell) change,
transmit a radio resource control (RRC) reconfiguration message including condition information for the conditional PSCell change for the SN,
receive an RRC reconfiguration complete message as a response to the RRC reconfiguration message, and
receive a secondary cell group (SCG) failure information including an identity of a PSCell associated with a failure of the conditional PSCell change, in case that the failure of the conditional PSCell change is identified,
wherein actions related to the conditional PSCell change are performed based on the condition information for the conditional PSCell change.

17. The base station of claim 16,
wherein the SCG failure information further includes a failure type, and
wherein the failure type includes one of a failure associated with random access or a failure associated with the conditional PSCell change.

18. The base station of claim 16,
wherein the capability information further includes performance information related to the conditional PSCell change,
wherein the identity of the PSCell corresponds to a physical cell identity of the PSCell.

19. The base station of claim 16,
wherein a timer associated with the conditional PSCell change is started based on the RRC reconfiguration message, and
wherein the failure of the conditional PSCell change is identified in case that a random access for the conditional PSCell change is not completed until the timer expires.

20. The base station of claim 16,
wherein the RRC reconfiguration message is transmitted through a signaling radio bearer 3 (SRB 3), and
wherein the RRC reconfiguration complete message is received through the SRB 3.

* * * * *